(12) United States Patent
Okamoto et al.

(10) Patent No.: US 7,676,042 B2
(45) Date of Patent: Mar. 9, 2010

(54) TERMINAL APPARATUS, SERVER APPARATUS, AND DIGITAL CONTENT DISTRIBUTION SYSTEM

(75) Inventors: Ryuichi Okamoto, Osaka (JP); Akio Higashi, Osaka (JP); Satoshi Niwano, Osaka (JP); Hiroki Murakami, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/162,054

(22) PCT Filed: Jan. 24, 2007

(86) PCT No.: PCT/JP2007/051099

§ 371 (c)(1),
(2), (4) Date: Jul. 24, 2008

(87) PCT Pub. No.: WO2007/086435

PCT Pub. Date: Aug. 2, 2007

(65) Prior Publication Data

US 2009/0010439 A1    Jan. 8, 2009

(30) Foreign Application Priority Data

Jan. 25, 2006    (JP)    ............................. 2006-016365

(51) Int. Cl.
*H04L 9/08*    (2006.01)
(52) U.S. Cl. ........................... 380/278; 713/172; 726/26
(58) Field of Classification Search .................. 726/26, 726/29; 705/57; 380/280, 251, 278; 713/172
See application file for complete search history.

(56) References Cited

U.S. PATENT DOCUMENTS

| 2002/0107806 A1* | 8/2002 | Higashi et al. ................. 705/51 |
| 2003/0061165 A1* | 3/2003 | Okamoto et al. .............. 705/52 |
| 2003/0208532 A1 | 11/2003 | Kuriya |
| 2004/0034786 A1* | 2/2004 | Okamoto et al. ............ 713/189 |
| 2004/0133510 A1 | 7/2004 | Honjo et al. |

(Continued)

FOREIGN PATENT DOCUMENTS

EP    1 603 051    12/2005

(Continued)

OTHER PUBLICATIONS

International Search Report issued Apr. 10, 2007 in the International (PCT) Application of which the present application is the U.S. National Stage.

(Continued)

*Primary Examiner*—David Garcia Cervetti
(74) *Attorney, Agent, or Firm*—Wenderoth, Lind & Ponack, L.L.P.

(57) ABSTRACT

To reduce a frequency of recording communication management information for communication disconnection countermeasure. A digital content distribution system includes a license server (101) that issues a license, and a user terminal (103) that controls use of content based on the issued license. The license server (101) judges, according to the license to be issued, whether or not the communication management information for the communication disconnection countermeasure needs to be recorded, and notifies the user terminal of a result of the judgment. This enables the user terminal (103) to reduce the frequency of recording the communication management information.

16 Claims, 29 Drawing Sheets

U.S. PATENT DOCUMENTS

| | | | |
|---|---|---|---|
| 2004/0162846 A1* | 8/2004 | Nakahara et al. | 707/102 |
| 2004/0206814 A1* | 10/2004 | Kawai et al. | 235/380 |
| 2004/0215708 A1* | 10/2004 | Higashi et al. | 709/201 |
| 2006/0195405 A1* | 8/2006 | Miura et al. | 705/65 |
| 2006/0253400 A1* | 11/2006 | Okamoto et al. | 705/57 |
| 2007/0011416 A1* | 1/2007 | Lee | 711/162 |
| 2007/0219917 A1* | 9/2007 | Liu et al. | 705/59 |
| 2009/0070583 A1* | 3/2009 | von Mueller et al. | 713/168 |

FOREIGN PATENT DOCUMENTS

| | | |
|---|---|---|
| JP | 2-171846 | 7/1990 |
| JP | 4-239962 | 8/1992 |
| JP | 7-131452 | 5/1995 |
| JP | 3276021 | 2/2002 |
| JP | 2002-251524 | 9/2002 |
| JP | 2003-016041 | 1/2003 |
| JP | 2004-280791 | 10/2004 |

OTHER PUBLICATIONS

A. Frier et al., "The SSL 3.0 Protocol", [online], NetScape Communication Corp., Nov. 18, 1996, <URL: http://wp.netscape.com/eng/ssl3/draft203.txt>.

* cited by examiner

License 200

FIG. 4

License 200

| Terminal ID | License ID | Content ID | Usage condition type | Usage condition | Content key | Issuable count | Commit wait flag |
|---|---|---|---|---|---|---|---|
| 0001 | 0011 | 0001 | Stateless | Reproducible until end of March 2007 | 111111 | 1 | 1 |
| | 0012 | 0002 | Stateful | Reproducible once | 222222 | 1 | 0 |
| 0002 | 0021 | 0003 | Stateless | Reproducible until end of January 2007 | 333333 | Unlimited | 0 |
| ... | | | | | | | |

License database 301

FIG. 6

| Terminal ID 401 | Transaction-in-process existence 601 | Transaction-in-process identification flag 602 | Rollback requirement 603 |
|---|---|---|---|
| 0001 | Exist | 0 | Not required |

Transaction log 600

Transaction log database 502

Transaction log 1000

Transaction log database 902

Transaction log 600

| Terminal ID | Transaction-in-process existence | Transaction-in-process identification flag | Rollback requirement | Retention time limit |
|---|---|---|---|---|
| 401 | 601 | 602 | 603 | 2801 |
| 0001 | Exist | 0 | Not required | 2007/1/31 |

(b)

Transaction log database 502

| Terminal ID | Transaction-in-process identification flag | Retention time limit |
|---|---|---|
| 401 | 602 | 2802 |
| 0001 | 0 | 2007/1/31 |
| 0003 | 1 | 2007/3/31 |
| ... | ... | ... |

| Server ID (1001) | Transaction-in-process identification flag (602) | Retention time limit (2901) |
|---|---|---|
| 0001 | 0 | 2007/1/31 |

Transaction log 1000

(b)

| Server ID (1001) | Transaction-in-process identification flag (602) | Retention time limit (2902) |
|---|---|---|
| 0001 | 0 | 2007/1/31 |
| 0003 | 1 | 2007/3/31 |
| ⋮ | ⋮ | ⋮ |

Transaction log database 902

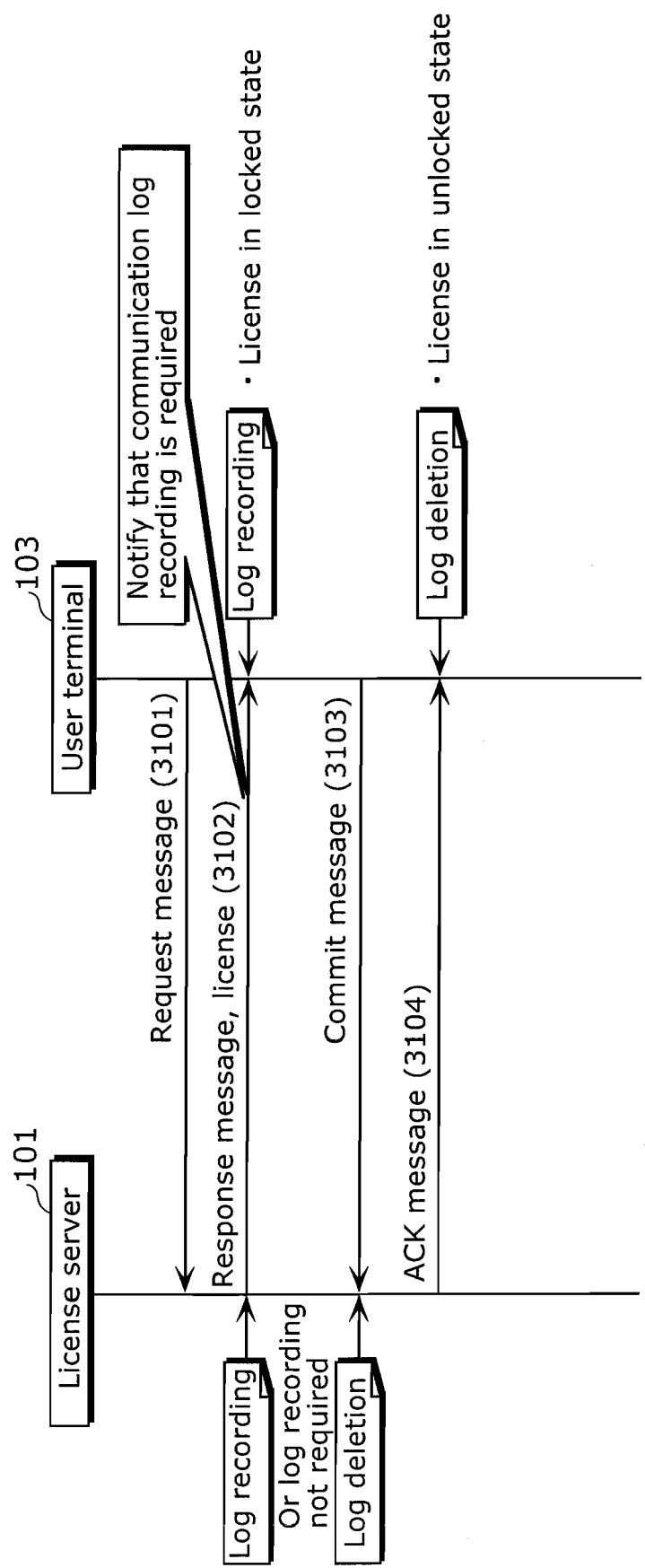

TERMINAL APPARATUS, SERVER APPARATUS, AND DIGITAL CONTENT DISTRIBUTION SYSTEM

TECHNICAL FIELD

The present invention relates to a system in which digital content, such as video or music, and a license for permitting use of the digital content are distributed from a server apparatus using a network and a user uses the digital content in a terminal apparatus. In particular, the present invention relates to a system and apparatuses that prevent unauthorized copying or tampering of the license in communication between the server apparatus and the terminal apparatus and, even when communication disconnection occurs, avoid loss or redistribution of the license.

BACKGROUND ART

In recent years, a system called a content distribution system has been increasingly put to practical use. In the content distribution system, digital content (hereafter referred to as "content") such as music, video, and games is distributed from a server apparatus to a terminal apparatus via Internet communication, digital broadcasting, and the like, to enable the content to be used in the terminal apparatus. Typical content distribution systems employ a copyright protection technique to protect a copyright of content and prevent unauthorized use of the content by a malicious user and the like. In detail, the copyright protection technique is a technique for securely controlling use of content by means of a cryptographic technique and so on.

For example, Patent Reference 1 describes the following system as one example of content distribution system. A terminal apparatus receives encrypted content, a usage condition, and a content decryption key from a server apparatus, verifies whether or not tampering has been made, and then verifies whether or not the usage condition is satisfied. Only when all of the verifications are successful, the terminal apparatus decrypts the content.

Thus, in conventional content distribution systems, a license (a generic name for data that includes a usage condition and a content decryption key, also referred to as a "usage right") is distributed from a server apparatus to a terminal apparatus. Since a public line of the Internet and the like is typically used as a path for distributing the license, there is a need to protect the license from eavesdropping and tampering. That is, there is a need to prevent unauthorized tampering of the usage condition and leakage of the content key. Furthermore, the server apparatus needs to perform authentication of the license distribution destination, in order to avoid distributing the license to an unintended terminal apparatus. A protocol for prevention of eavesdropping/tampering and authentication of a party-in-communication is called a Secure Authenticated Channel (SAC) protocol. For instance, Secure Socket Layer (SSL) is well known (for example, see Nonpatent Reference 1).

Moreover, when communication disconnection occurs during license distribution due to a failure of a communication apparatus or a communication line, power discontinuity, and the like, there is a possibility that the license may be lost. In such a case, the user suffers an inconvenience of being unable to reproduce the content which the user purchased. For example, Patent Reference 2 and Patent Reference 3 each describe a protocol for avoiding loss of communication data due to communication disconnection, by means of data retransmission.

Patent Reference 1: Japanese Patent No. 3276021
Patent Reference 2: Japanese Unexamined Patent Application Publication No. 2002-251524
Patent Reference 3: Japanese Unexamined Patent Application Publication No. 2003-16041
Non-patent Reference 1: A. Frier, P. Karlton, and P. Kocher, "The SSL 3.0 Protocol", [online], NetScape Communications Corp., Nov. 18, 1996 (searched on Jan. 23, 2006).

DISCLOSURE OF INVENTION

Problems that Invention is to Solve

However, the SAC protocol and the communication disconnection countermeasure protocol place importance on versatility for extending their scopes of application, and are proposed independently of each other. Therefore, to realize all of the functions of license eavesdropping/tampering prevention, party-in-communication authentication, and communication disconnection countermeasure by using both the SAC protocol and the communication disconnection countermeasure protocol, round-trip communication needs to be performed the number of times that is required for both of the protocols.

Furthermore, consider the case of consecutively performing transactions such as license obtainment transactions or license return transactions. If the SAC protocol and the communication disconnection countermeasure protocol are simply repeated for each transaction, the number of times round-trip communication is performed increases by a multiple of the number of times of round-trip communication required for one transaction. Suppose the number of times of round-trip communication required for one transaction is 4. In this case, to process n transactions, round-trip communication needs to be performed 4n times.

This causes a communication delay in completing a transaction by the terminal apparatus, and induces a wait time for the user to obtain a response after making a request.

Moreover, as shown in FIG. 26, a license server 101 needs to perform log recording 2601 and log deletion 2603 for license issuance management, in a period from when the license server 101 transmits a response message to a license obtainment request message from a user terminal 103 to when the license server 101 receives a commit message, and the user terminal 103 needs to perform log recording 2602 and log deletion 2604 for license management, in a period from when the user terminal 103 receives the response message to when the user terminal 103 receives an ACK message. At each instance of such log recording, the license server 101 and the user terminal 103 are required to store data. In the case where log recording is performed by writing onto a nonvolatile memory such as a flash memory to guard against power discontinuity and the like, this affects a lifetime of the memory that is capable of only a limited number of writes.

The present invention solves the above conventional problems, and has an object of providing a system and apparatuses that realize a protocol according to which, when license management between a server apparatus and a terminal apparatus is performed by log recording, an amount of information recorded in the server apparatus and the terminal apparatus can be reduced, and a frequency of performing log recording in the server apparatus and the terminal apparatus can be reduced.

Moreover, the present invention has an object of providing a system and apparatuses that realize a protocol according to which, in the case of performing a plurality of transactions, the number of times of round-trip communication between the server apparatus and the terminal apparatus can be reduced, while achieving all of the functions of license eavesdropping/tampering prevention, party-in-communication authentication, and communication disconnection countermeasure.

Means to Solve the Problems

To solve the above conventional problems, a terminal apparatus according to Claim 1 of the present invention is a terminal apparatus that transmits a content key request message to a server apparatus, receives a response message to the content key request message from the server apparatus, and uses content, wherein the content key request message includes a transaction flag that is associated with a content key request process currently in execution and takes a value of 0 or 1, the response message includes a content key and a transaction flag storage requirement flag, the transaction flag storage requirement flag indicating whether or not the transaction flag needs to be stored, the terminal apparatus includes: a message transmission and reception unit that performs message transmission and reception with the server apparatus; a transaction flag storage unit that stores the transaction flag therein; and a transaction flag writing unit that writes the transaction flag into the transaction storage unit, and the transaction writing unit writes the transaction flag into the transaction storage unit, when (1) the message transmission and reception unit receives the response message, and (2) the transaction flag storage requirement flag included in the response message indicates that the transaction flag needs to be stored.

Moreover, in the terminal apparatus according to the present invention, the message transmission and reception unit, having received the response message, transmits a commit message to the server apparatus, the commit message notifying that the reception of the response message is successful, and the transaction flag writing unit deletes the transaction flag from the transaction storage unit, when (1) the message transmission and reception unit receives an ACK message from the server apparatus in response to the commit message, and (2) the transaction flag is stored in the transaction storage unit.

According to this structure, when the transaction flag storage requirement flag indicates that the storage is not required in accordance with an issuable count or a usage condition, the terminal apparatus does not need to perform log recording for license management. Thus, the use of the transaction flag storage requirement flag makes it possible to reduce the amount of information recorded and the frequency of log recording in the server apparatus and the terminal apparatus.

Moreover, in the terminal apparatus according to the present invention, the message transmission and reception unit omits the transmission of the commit message, when the transaction flag storage requirement flag included in the response message indicates that the transaction flag does not need to be stored.

According to this structure, when the transaction flag storage requirement flag indicates that the storage is not required and therefore log recording is not performed, the terminal apparatus does not need to transmit the commit message about license reception, to the server apparatus. Also, the server apparatus does not need to transmit the ACK message in response to the commit message. As a result, the number of times round-trip communication is performed between the server apparatus and the terminal apparatus can be reduced.

The server apparatus according to the present invention is a server apparatus that transmits a response message to a content key request message received from a terminal apparatus, wherein the content key request message includes a transaction flag that is associated with a content key request process currently in execution and takes a value of 0 or 1, the response message includes a content key and a transaction flag storage requirement flag, the transaction flag storage requirement flag indicating whether or not the transaction flag needs to be stored, the server apparatus includes: a message transmission and reception unit that performs message transmission and reception with the terminal apparatus; and a transaction flag storage requirement setting unit that sets the transaction flag storage requirement flag included in the response message, and the transaction flag storage requirement setting unit judges whether or not the transaction flag needs to be stored, and set a result of the judgment in the transaction flag storage requirement flag.

According to this structure, the server apparatus notifies the terminal apparatus of the transaction flag storage requirement flag, in accordance with a usage condition or whether or not a license issuable count is managed. When the storage is not required, the server apparatus and the terminal apparatus do not need to perform log recording of the transaction flag and the like for license management. Thus, the use of the transaction flag storage requirement flag makes it possible to realize the protocol that can reduce the amount of information recorded and the frequency of log recording in the server apparatus and the terminal apparatus.

It is to be noted that, to achieve the stated objects, the present invention can also be realized as a digital content distribution system including the terminal apparatus and the server apparatus, a transaction processing method including steps corresponding to the characteristic units included in the terminal apparatus and the server apparatus, or a program including these steps. Such a program can be not only stored on a ROM and the like, but also distributed via a recording medium such as a CD-ROM or a communication network.

EFFECTS OF THE INVENTION

According to the present invention, in a license distribution process, the server apparatus notifies the terminal apparatus whether or not log recording is required, so that log recording can be omitted when not required. This contributes to a reduced memory writing frequency.

Also, the process to be performed at the time of license storage, transfer, and the like is changed depending on a type of a usage condition included in a license. This produces an effect of achieving license management that can omit a process such as unnecessary SAC establishment, while preventing use of content over a permitted range.

Hence it is possible to provide a system and apparatuses that realize a protocol which can achieve all of the functions of license eavesdropping/tampering prevention, party-in-communication authentication, and communication disconnection countermeasure, reduce the number of times of round-trip communication between the server apparatus and the terminal apparatus in the case of performing a plurality of transactions, and further reduce the amount of information managed and held and the frequency of recording in the server apparatus and the terminal apparatus for achieving the above functions.

BRIEF DESCRIPTION OF DRAWINGS

FIG. 4 shows one example of a license database 301 in the embodiment of the present invention.

FIG. 6 shows one example of a transaction log 600 in the embodiment of the present invention.

FIG. 28 shows one example of a data structure in the case where a retention time limit is added to each of the transaction log and the transaction log database in the license server.

FIG. 29 shows one example of a data structure in the case where a retention time limit is added to each of the transaction log and the transaction log database in the user terminal.

FIG. 31 is a sequence diagram of another session in the digital content distribution system according to the present invention.

NUMERICAL REFERENCES

Figure 1:
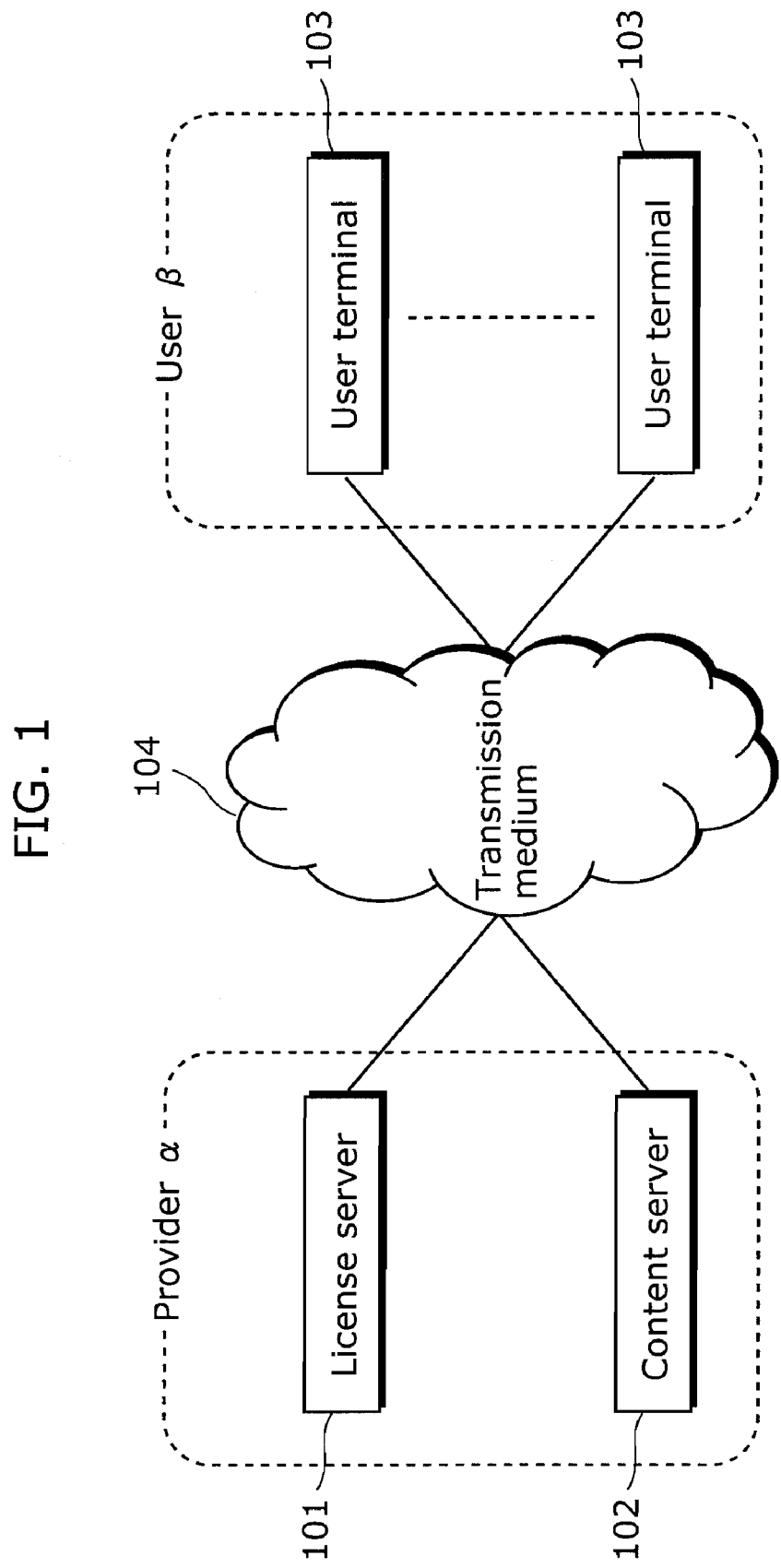
FIG. 1 is a block diagram showing a structure of a digital content distribution system in an embodiment of the present invention.

101 License server
102 Content server
103 User terminal
104 Transmission medium
200 License
201 License ID
202 Content ID
203 Usage condition type
204 Usage condition
205 Content key
301 License database
302 Secure communication unit
303 License issuance unit
401 Terminal ID
402 Issuable count
403 Commit wait flag
501 Secure communication control unit
502 Transaction log database
503 Unique information storage unit
504 Random number generation unit
505 Cryptographic processing unit
506 Communication unit
600 Transaction log
601 Transaction-in-process existence
602 Transaction-in-process identification flag
603 Rollback requirement
801 License storage unit
802 Content storage unit
803 Secure communication unit
804 License obtainment unit
805 Content obtainment unit
806 Content output control unit
807 Content output unit
901 Secure communication unit
902 Transaction log database
903 Unique information storage unit
904 Random number generation unit
905 Cryptographic processing unit
906 Communication unit
1000 Transaction log
1001 Server ID

BEST MODE FOR CARRYING OUT THE INVENTION

First Embodiment

The following describes a digital content distribution system in an embodiment of the present invention.

Figure 27:
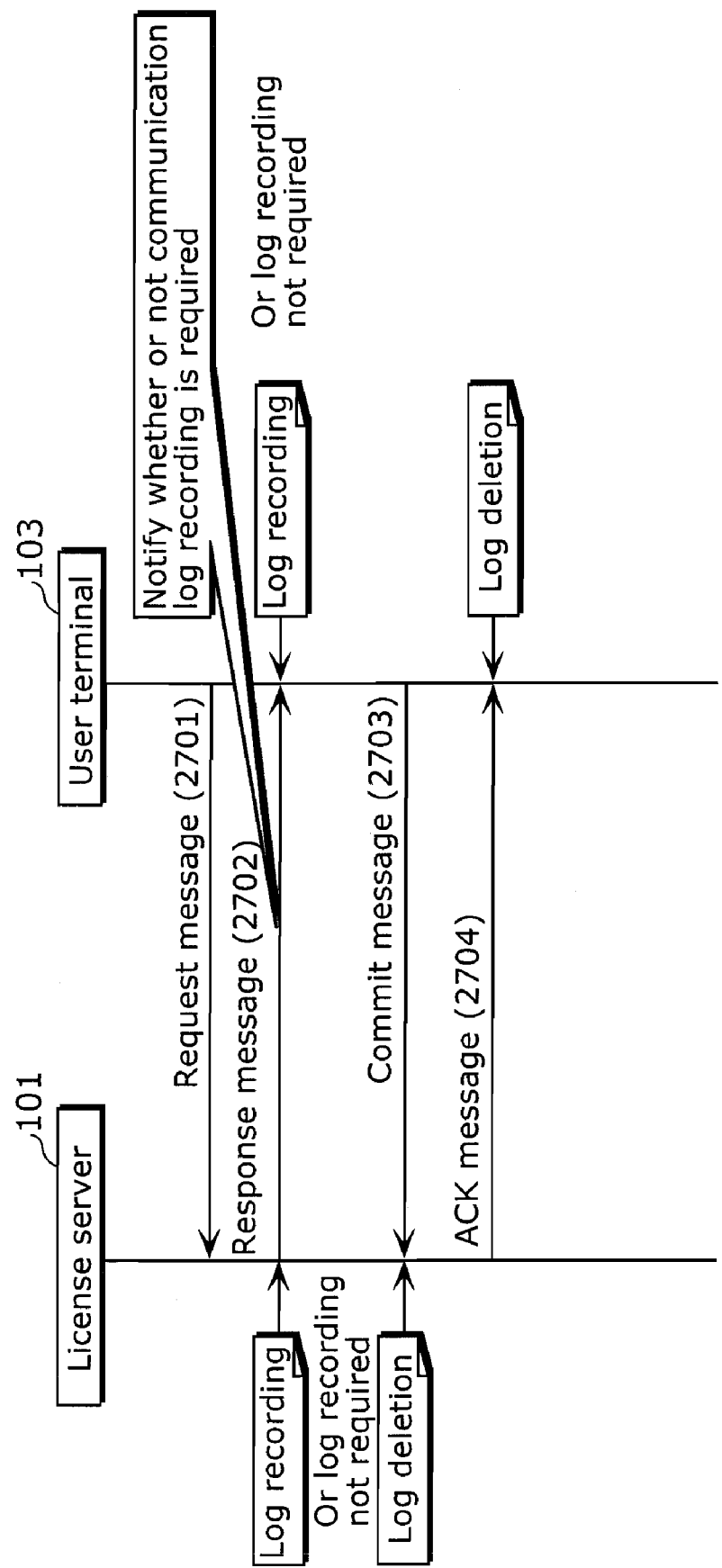
FIG. 27 is a communication sequence diagram of a digital content distribution system including the license server and the user terminal according to the present invention.

FIG. 1 shows an overall structure of the digital content distribution system in this embodiment. The digital content distribution system according to the present invention has the following characteristic feature. As shown in FIG. 27, when a license request message (2701) is transmitted from a user terminal 103 to a license server 101, the license server 101 judges whether or not log recording of a transaction identification flag for license management is required, and transmits a response message (2702) including a judgment result of whether or not log recording is required, to the user terminal 103. The user terminal 103 performs log recording when required, and does not perform log recording when not required.

In FIG. 1, the digital content distribution system includes a license server 101, a content server 102, a plurality of user terminals 103, and a transmission medium 104. Each component of the digital content distribution system is described below.

The license server 101 is a server that is installed on provider α side, manages user β's right to use content, and distributes a license 200 to a user terminal 103. The license 200 will be described later with reference to FIG. 2.

The content server 102 is a server that is installed on provider α side, and distributes the content to the user terminal 103. Here, the content is distributed in such an encrypted form that can be decrypted using the license 200.

The user terminal 103 is installed on user β side. The user terminal 103 manages the license 200 distributed from the license server 101, and reproduces the content distributed from the content server 102 using the license 200.

The transmission medium 104 includes a wired or wireless transmission medium such as the Internet, Cable Television (CATV), a broadcast wave, and the like, and a portable recording medium. The transmission medium 104 connects the license server 101 and the content server 102 to the user terminal 103, and the user terminal 103 to another user terminal 103 so that data can be exchanged between them.

This completes the description of the overall structure of the digital content distribution system in this embodiment.

Figure 2:
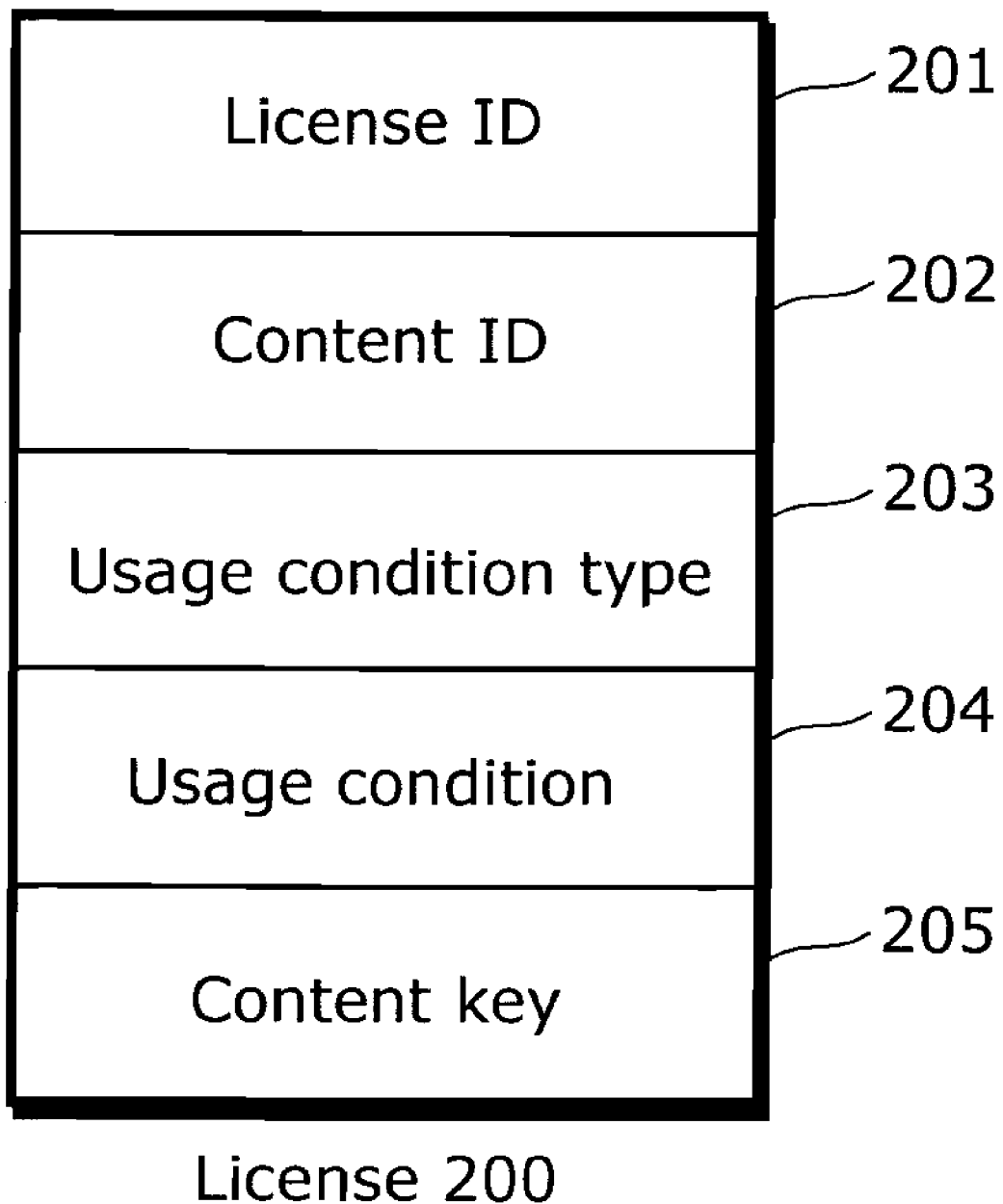
FIG. 2 shows one example of a license 200 in the embodiment of the present invention.

FIG. 2 shows one example of the license 200. In FIG. 2, the license 200 includes a license ID 201, a content ID 202, a usage condition type 203, a usage condition 204, and a content key 205.

The license ID 201 shows an ID for uniquely identifying the license 200. The content ID 202 shows an ID of the content for use with the license 200. The usage condition type 203 shows information indicating a type of the usage condition 204. In this embodiment, the usage condition type 203 shows information indicating whether the usage condition 204 is a usage condition that needs to be updated (for example, "reproducible once") or a usage condition that does not need to be updated (for example, "reproducible until March 2007"). The usage condition 204 shows a condition for permitting use of the content. The content key 205 shows a decryption key for decrypting the content.

Figure 3:
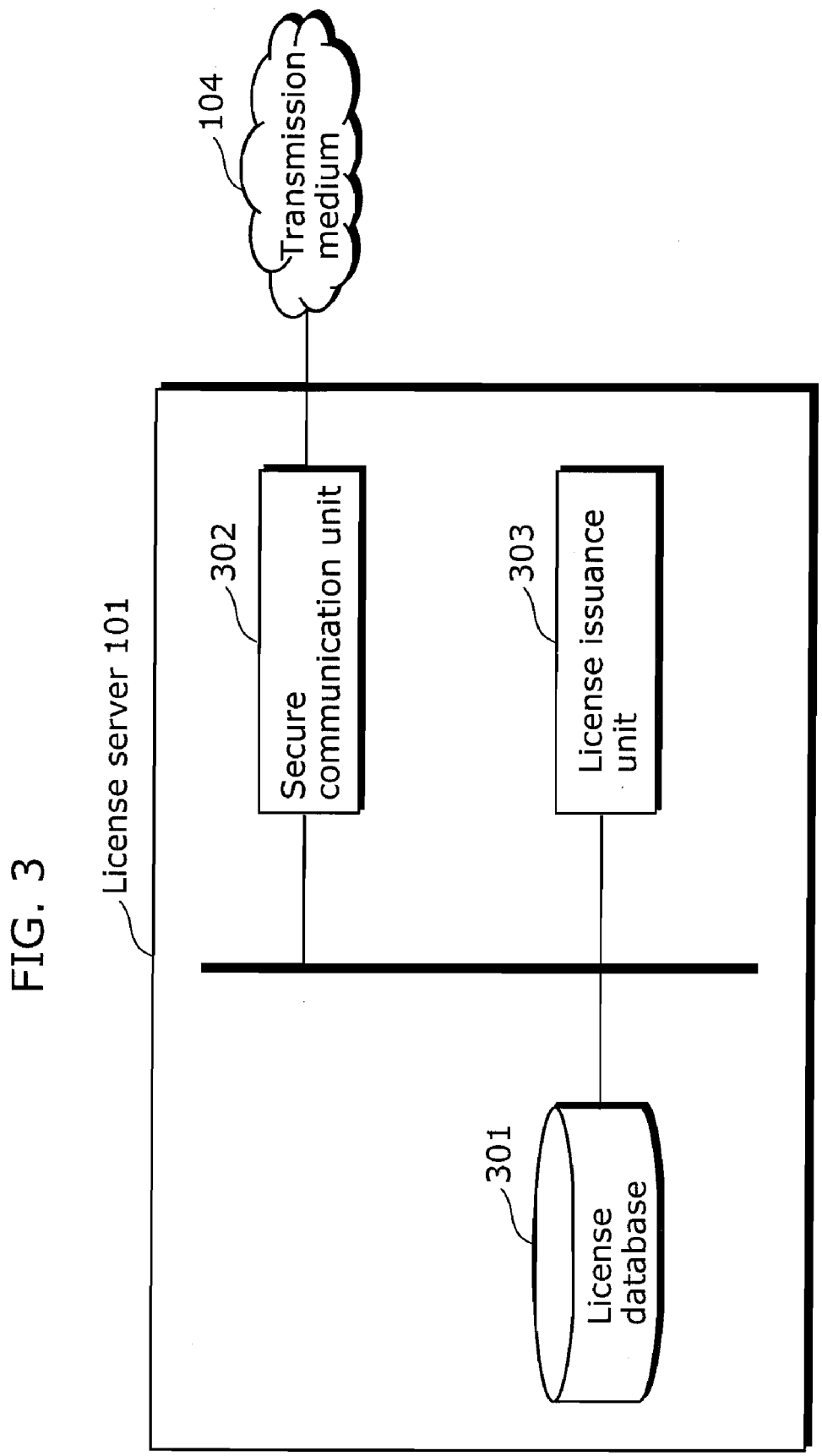
FIG. 3 is a block diagram showing a structure of a license server 101 in the embodiment of the present invention.

FIG. 3 shows an overall structure of the license server 101 in this embodiment. In FIG. 3, the license server 101 includes a license database 301, a secure communication unit 302, and a license issuance unit 303. Each component of the license server 101 is described below.

FIG. 4 shows one example of the license database 301. As shown in FIG. 4, the license database 301 is a database for managing, for each user terminal 103, a license 200 that can be issued to the user terminal 103. In FIG. 4, the license database 301 includes a terminal ID 401, a license 200 that can be issued to a user terminal 103 identified by the terminal ID 401, an issuable count 402, and a commit wait flag 403. The terminal ID 401 is an ID for uniquely identifying the user terminal 103 in the digital content distribution system. The issuable count 402 shows how many times the license 200 can be issued to the user terminal 103. The issuable count 402 is decreased by 1 each time the license server 101 transmits the license 200 to the user terminal 103 and receives a license reception completion notification (hereafter referred to as a "commit message") in response. When the issuable count 402 reaches 0, the license 200 is no longer issuable. In this embodiment, when the issuable count 402 reaches 0, the license 200 is deleted from the license database 301. The commit wait flag 403 is information indicating whether or not the license server 101 is in a state of waiting for the commit message from the user terminal 103. In this embodiment, the commit wait flag 403 takes a value of "0" or "1". When the commit wait flag 403 is "1", the license server 101 is in a state of waiting for the commit message. When the commit wait flag 403 is "0", the license server 101 is not in a state of waiting for the commit message. In this embodiment, when transmitting a license 200 with a limited issuable count 402 to the user terminal 103, the license server 101 sets the commit wait flag 403 to "1". Upon receiving the commit message when the commit wait flag 403 is "1", the license server 101 performs a process of decreasing the issuable count 402 by 1 and changing the commit wait flag 403 to "0", as a commit process.

In the example of FIG. 4, two licenses 200 whose license IDs 201 are "0011" and "0012" are issuable to a user terminal 103 whose terminal ID 401 is "0001", and a license 200 whose license ID 201 is "0021" is issuable to a user terminal 103 whose terminal ID 401 is "0002". Also, the license 200 whose license ID 201 is "0011", which is issuable to the user terminal 103 whose terminal ID 401 is "0001", can be issued only once, and is currently in a commit wait state.

Referring back to FIG. 3, the secure communication unit 302 performs authentication of the user terminal 103, confidential communication (communication with eavesdropping/tampering prevention and party-in-communication authentication) between the license server 101 and the user terminal 103, and transaction interruption handling. A structure of the secure communication unit 302 will be described later with reference to FIG. 5.

The license issuance unit 303 is a processing unit that performs a process of issuing a license 200 in response to a request from the user terminal 103.

This completes the description of the overall structure of the license server 101.

Figure 5:
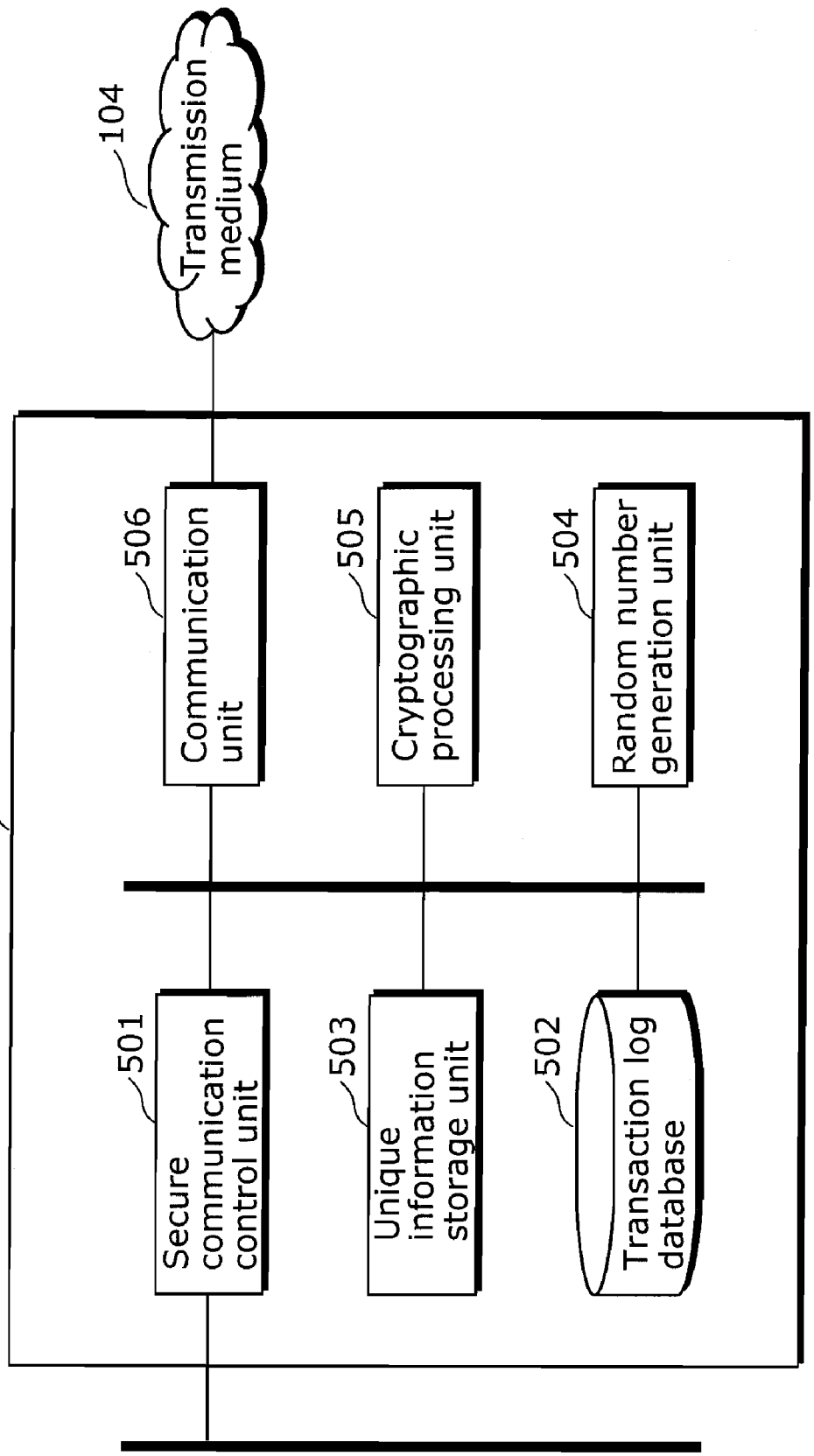
FIG. 5 is a block diagram showing a structure of a secure communication unit 302 in the embodiment of the present invention.

The following describes the structure of the secure communication unit 302 in the license server 101, with reference to FIG. 5. In FIG. 5, the secure communication unit 302 includes a secure communication control unit 501, a transaction log database 502, a unique information storage unit 503, a random number generation unit 504, a cryptographic processing unit 505, and a communication unit 506. Each component of the secure communication unit 302 is described below.

The secure communication control unit 501 performs overall control of the secure communication unit 302. The secure communication control unit 501 controls processes such as a process of authenticating the user terminal 103, a process of encrypting/decrypting data exchanged with the user terminal 103, and a process of checking tampering. Furthermore, the secure communication control unit 501 manages a transaction log 600 such as the one shown in FIG. 6 on a nonvolatile memory, and performs a process of recording the transaction log 600 to the transaction log database 502 according to need. In the case where a transaction currently in execution is interrupted due to communication disconnection or the like, the secure communication control unit 501 performs a predetermined process based on information recorded on the transaction log database 502, with it being possible to complete the interrupted transaction or return to a state before the execution of the interrupted transaction.

In FIG. 6, the transaction log 600 includes a terminal ID 401, a transaction-in-process existence 601, a transaction-in-process identification flag 602, and a rollback requirement 603. The terminal ID 401 shows an ID of the user terminal 103 which is communicating with the license server 101. The transaction-in-process existence 601 shows whether or not there is a transaction that is currently being processed. The transaction-in-process identification flag 602 takes a value of "0" or "1" that is assigned to the transaction currently in process. In this embodiment, the values "0" and "1" are alternately assigned to transactions. The rollback requirement 603 shows information about whether or not the license database 301 needs to be rolled back when the transaction in process is terminated incompletely. Rollback referred to here is to rewind, when a failure occurs in a database, data to a recorded checkpoint and restart processing at the checkpoint. In the example of FIG. 6, the license server 101 is communicating with the user terminal 103 whose terminal ID 401 is "0001", there is a transaction currently in process whose transaction-in-process identification flag 602 is "0", and the license database 301 does not need to be rolled back even when this transaction is terminated incompletely.

Figure 7:
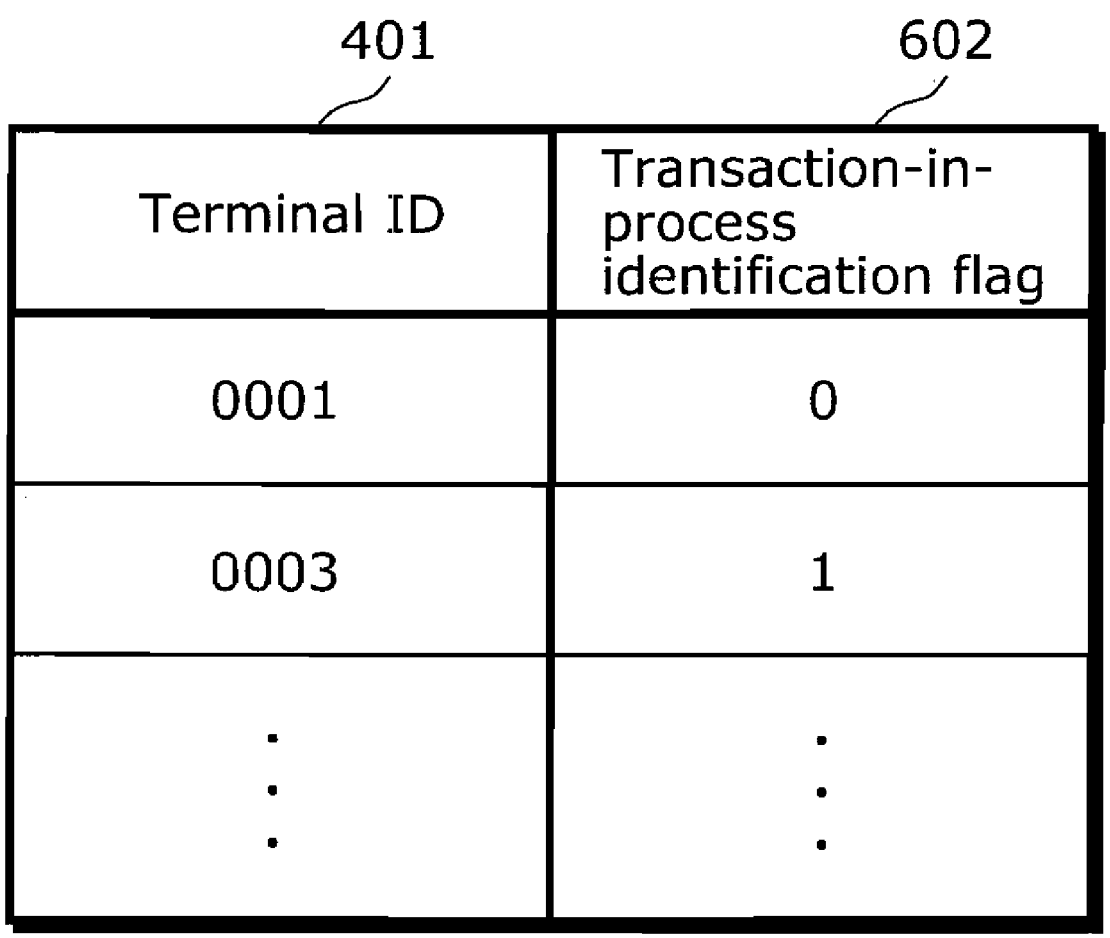
FIG. 7 shows one example of a transaction log database 502 in the embodiment of the present invention.

The transaction log database 502 is realized by a nonvolatile recording medium. FIG. 7 shows one example of the transaction log database 502. As shown in FIG. 7, the transaction log database 502 is a database that records each pair of a terminal ID 401 and a transaction-in-process identification flag 602.

The unique information storage unit 503 stores a server public key certificate including public key KDs unique to the license server 101, secret key KEs unique to the license server 101, and a public key certificate of a certificate authority, according to public key cryptography. The server public key certificate is generated by the certificate authority signing public key KDs of the license server 101. In this embodiment, a commonly used X.509 certificate format is employed as a format of the public key certificate. For details on the public key cryptography and the X.509 certificate format, see ITU-T document X.509 "The Directory: Public-key and attribute certificate frameworks".

The random number generation unit 504 generates a random number.

The cryptographic processing unit 505 performs data encryption and decryption, signature generation and verification, session key generation parameter generation, and session key generation. Advanced Encryption Standard (AES) is used as a data encryption and decryption algorithm, whilst Elliptic Curve Digital Signature Algorithm (EC-DSA) is used as a signature generation and verification algorithm. For details on AES, see National Institute Standard and Technology (NIST), FIPS Publication 197. For details on EC-DSA, see IEEE 1363 Standard.

To perform data encryption or decryption, the cryptographic processing unit 505 receives an input of an AES key and plaintext data or ciphertext data, and outputs data generated by encryption or decryption using the AES key. To perform signature generation or verification, the cryptographic processing unit 505 receives an input of signature target data or signature verification data and a secret key or a public key, and outputs signature data or a verification result. To perform session key generation parameter generation, the cryptographic processing unit 505 receives an input of a random number, and outputs a Diffie-Hellman parameter. To perform session key generation, the cryptographic processing unit 505 receives an input of the random number and the Diffie-Hellman parameter, and outputs a session key. Here, Elliptic Curve Diffie-Hellman (EC-DH) is used to generate the session key. For details on the EC-DH algorithm, see the aforementioned IEEE 1363 Standard.

The communication unit 506 performs communication with the user terminal 103.

This completes the description of the structure of the secure communication unit 302 in the license server 101.

Figure 8:
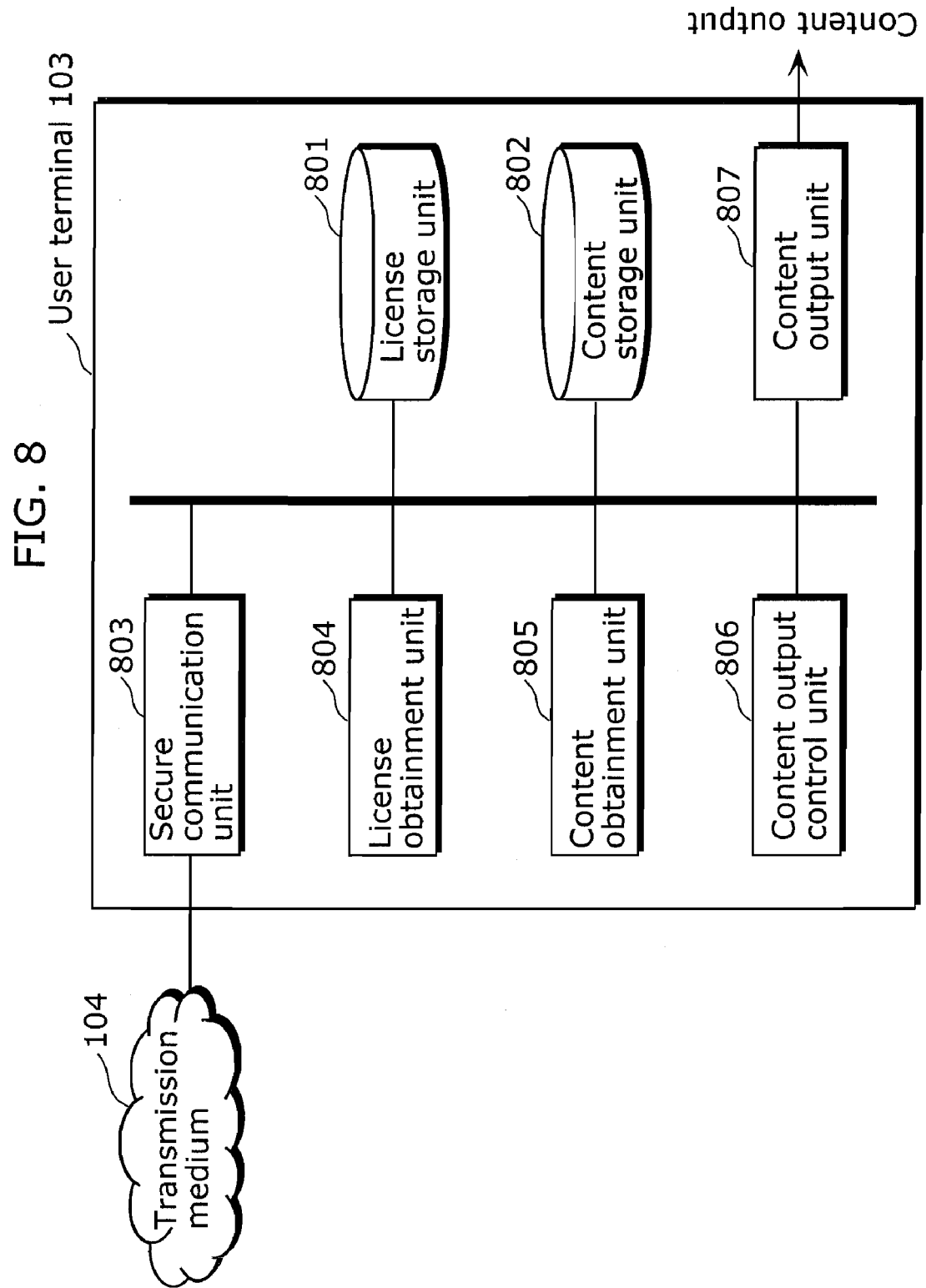
FIG. 8 is a block diagram showing a structure of a user terminal 103 in the embodiment of the present invention.

The following describes a structure of the user terminal 103 in this embodiment, with reference to FIG. 8. In FIG. 8, the user terminal 103 includes a license storage unit 801, a content storage unit 802, a secure communication unit 803, a license obtainment unit 804, a content obtainment unit 805, a content output control unit 806, and a content output unit 807. Each component of the user terminal 103 is described below.

The license storage unit 801 stores a license 200 obtained from the license server 101. The license storage unit 801 securely stores the license 200 within a tamper-resistant memory or the like.

The content storage unit 802 stores encrypted content obtained from the content server 102.

The secure communication unit 803 performs authentication of the license server 101, confidential communication (communication with eavesdropping/tampering prevention and party-in-communication authentication) between the license server 101 and the user terminal 103, and transaction interruption handling. A structure of the secure communication unit 803 will be described later with reference to FIG. 9.

The license obtainment unit 804 performs a process of requesting the license server 101 to issue the license 200.

The content obtainment unit 805 obtains the content from the content server 102.

The content output control unit 806 controls output of the content based on the license 200.

The content output unit 807 decrypts the content using a content key 205 and outputs the decrypted content, in accordance with an instruction from the content output control unit 806.

This completes the description of the overall structure of the user terminal 103.

Figure 9:
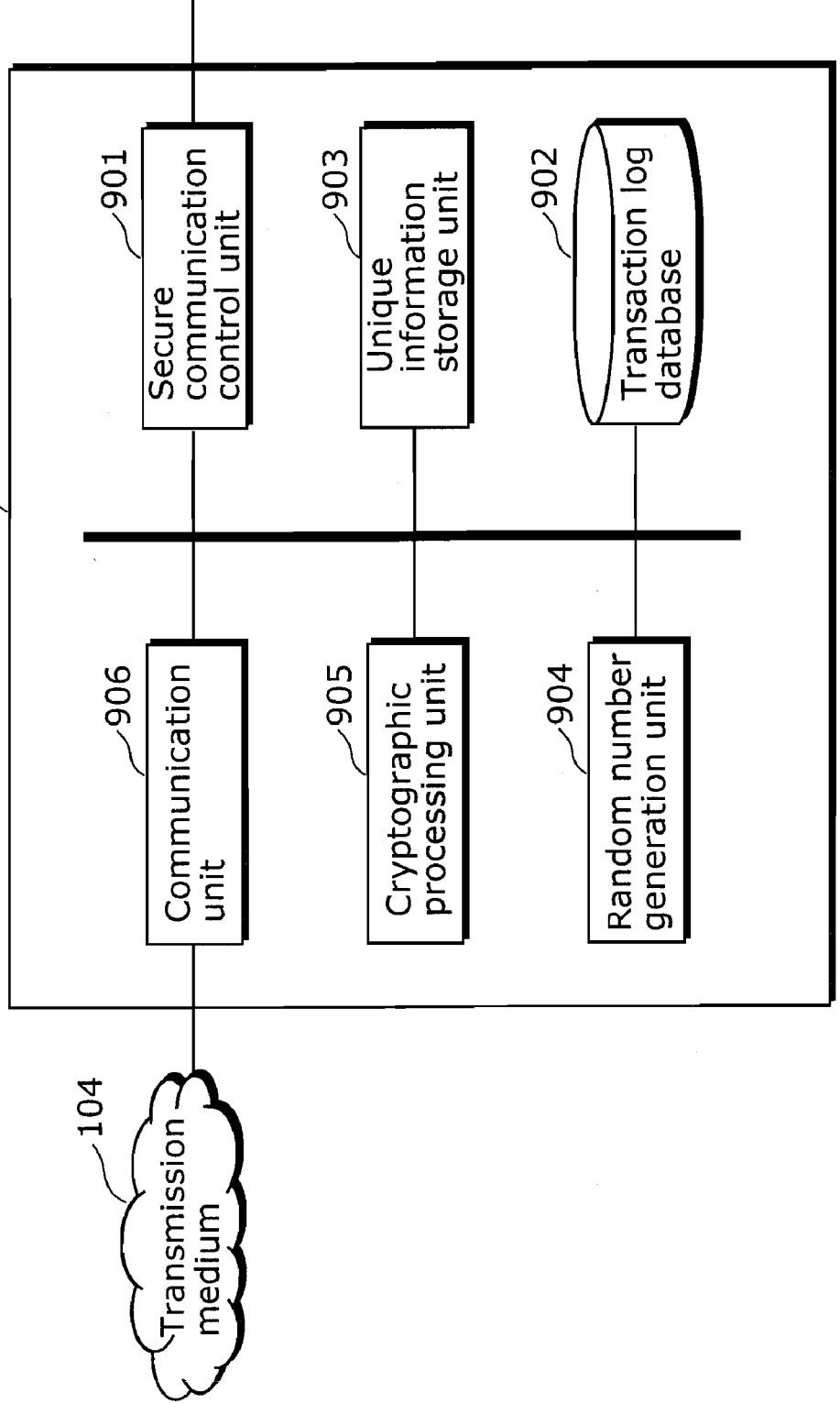
FIG. 9 is a block diagram showing a structure of a secure communication unit 803 in the embodiment of the present invention.

The following describes the structure of the secure communication unit 803 in the user terminal 103, with reference to FIG. 9. In FIG. 9, the secure communication unit 803 includes a secure communication control unit 901, a transaction log database 902, a unique information storage unit 903, a random number generation unit 904, a cryptographic processing unit 905, and a communication unit 906. Each component of the secure communication unit 803 is described below.

The secure communication control unit 901 performs overall control of the secure communication unit 803. The secure communication control unit 901 controls processes such as a process of authenticating the license server 101, a process of encrypting/decrypting data exchanged with the license server 101, and a process of checking tampering. Furthermore, the secure communication control unit 901 manages a transaction log 1000 such as the one shown in FIG. 10 on a nonvolatile memory, and performs a process of recording the transaction log 1000 to the transaction log database 902 according to need. In the case where a transaction currently in execution is interrupted due to communication disconnection or the like, the secure communication control unit 901 performs a predetermined process based on information recorded on the transaction log database 902, with it being possible to complete the interrupted transaction or return to a state before the execution of the interrupted transaction.

Figure 10:
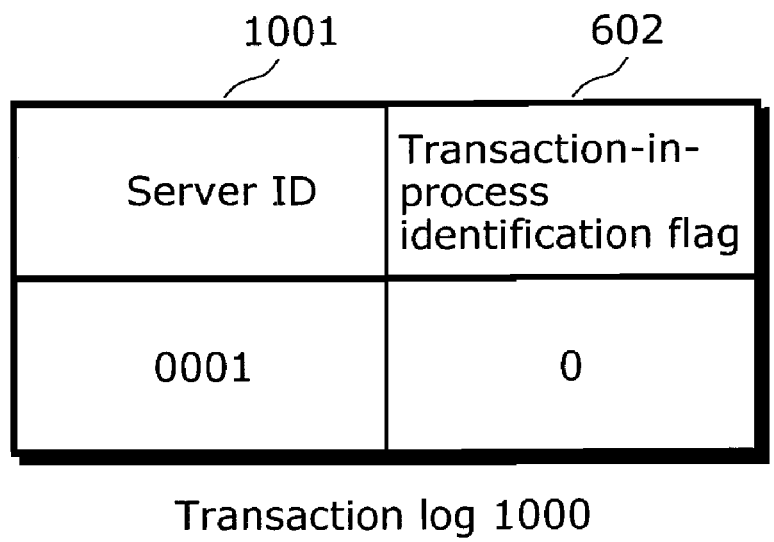
FIG. 10 shows one example of a transaction log 1000 in the embodiment of the present invention.

In FIG. 10, the transaction log 1000 includes a server ID 1001 and a transaction-in-process identification flag 602. The server ID 1001 shows an ID of the license server 101 which is communicating with the user terminal 103. The transaction-in-process identification flag 602 takes a value of "0" or "1" that is assigned to a transaction currently in process, as with the transaction log 600. In the example of FIG. 10, the user terminal 103 is communicating with the license server 101 whose server ID 1001 is "0001", and the transaction-in-process identification flag 602 assigned to the transaction currently in process is "0".

Figure 11:
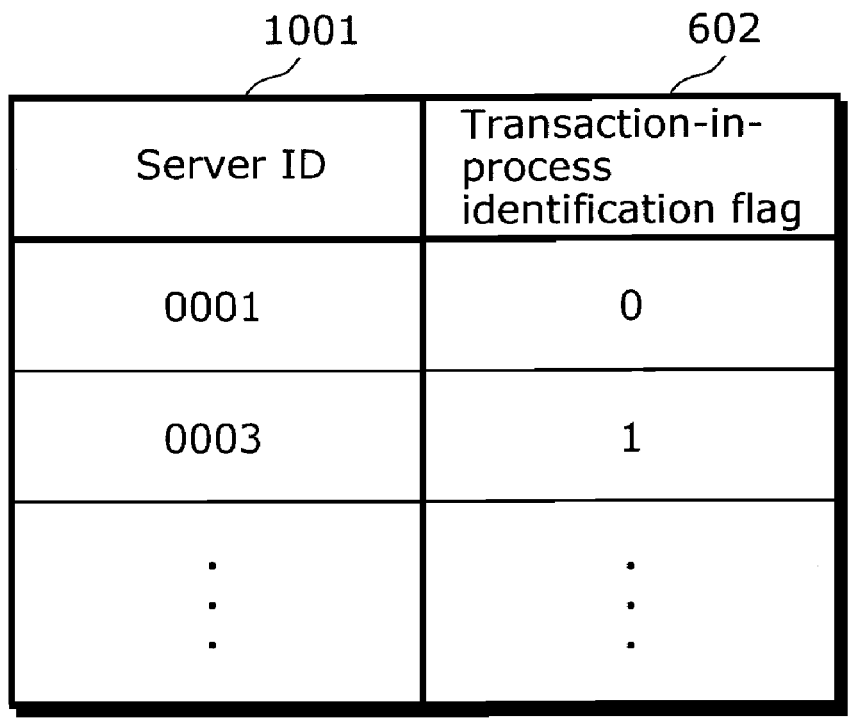
FIG. 11 shows one example of a transaction log database 902 in the embodiment of the present invention.

The transaction log database 902 is realized by a nonvolatile recording medium. FIG. 11 shows one example of the transaction log database 902. As shown in FIG. 11, the transaction log database 902 is a database that records each pair of a server ID 401 and a transaction-in-process identification flag 602.

The unique information storage unit 903 stores a terminal public key certificate including public key KDc unique to the user terminal 103, secret key KEc unique to the user terminal 103, and the public key certificate of the certificate authority, according to the public key cryptography. The terminal public key certificate is generated by the certificate authority signing public key KDc of the user terminal 103. In this embodiment, the X.509 certificate format is used as a format of the public key certificate, as in the case of the license server 101.

The random number generation unit 904 generates a random number.

The cryptographic processing unit 905 performs data encryption and decryption, signature generation and verification, session key generation parameter generation, and session key generation. The input and output of the cryptographic processing unit 905 are the same as those of the cryptographic processing unit 505 in the license server 101.

The communication unit 906 performs communication with the license server 101.

This completes the description of the structure of the secure communication unit 803 in the user terminal 103.

This completes the description of the structure of the digital content distribution system in this embodiment.

The following describes processes performed in the digital content distribution system in this embodiment, with reference to flowcharts.

Figure 12:
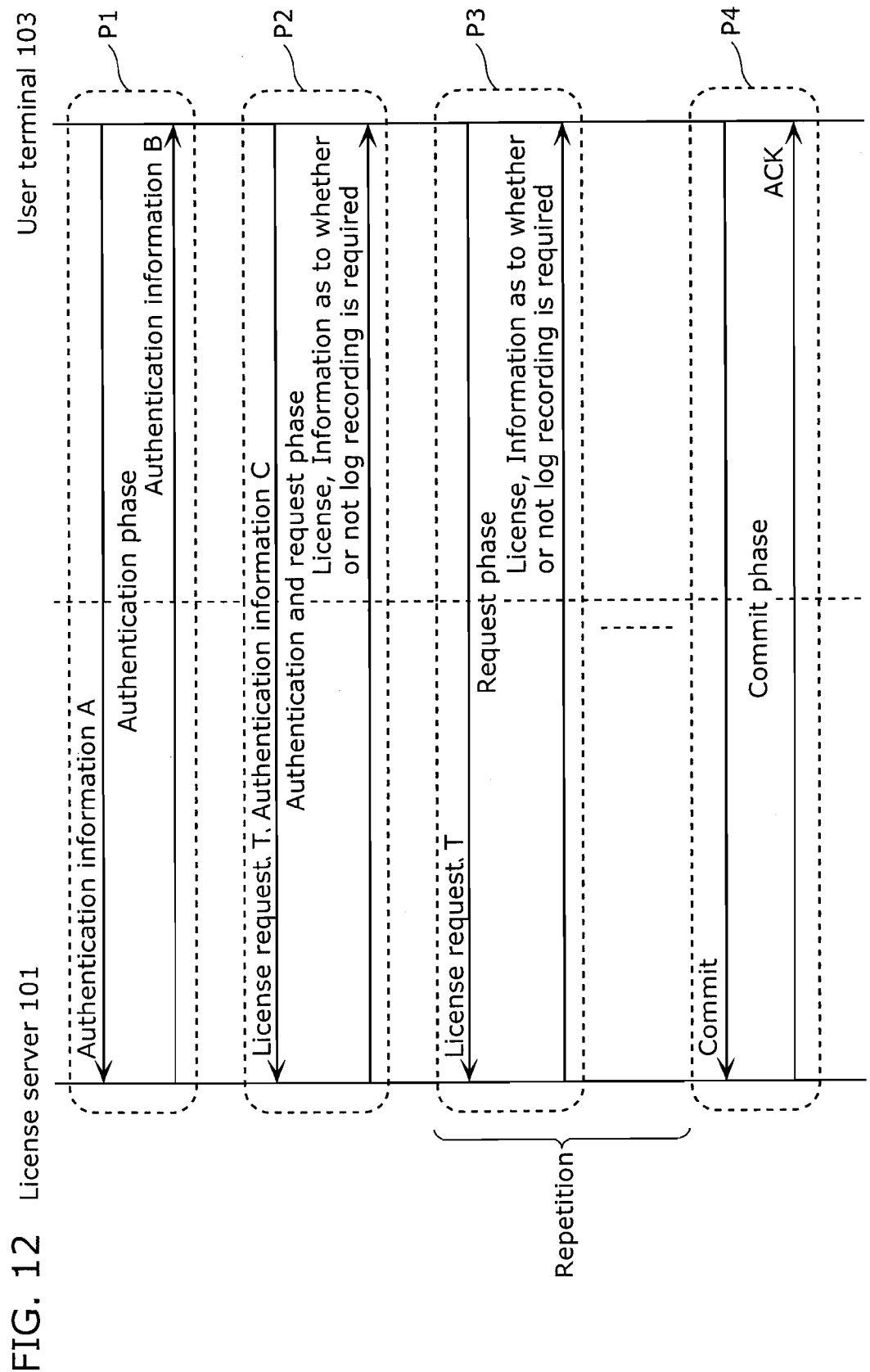
FIG. 12 shows a license obtainment process (in the case where a transaction log is not recorded on the transaction log database 902 when the user terminal 103 and the license server 101 start communication) in the embodiment of the present invention.
Figure 13:
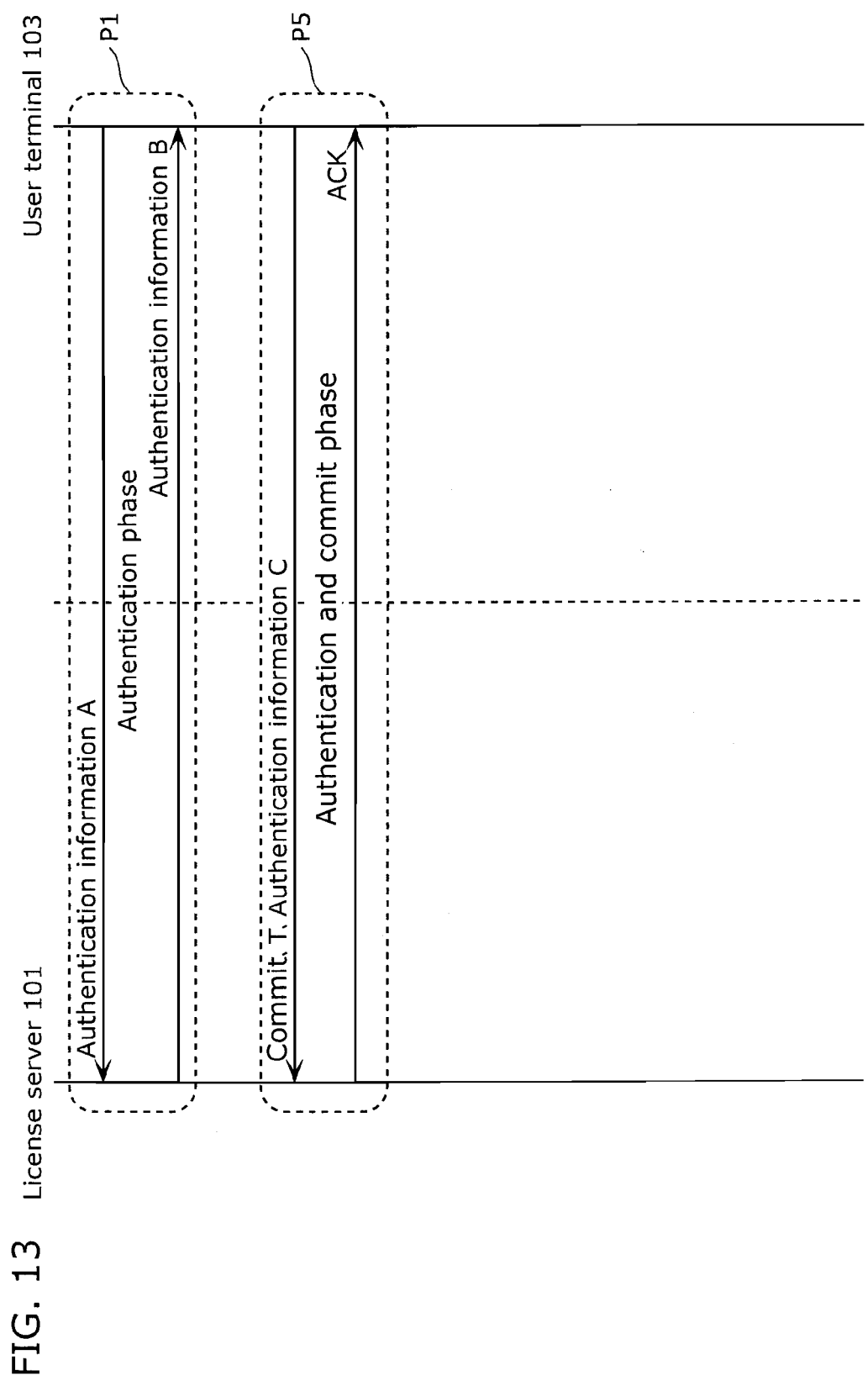
FIG. 13 shows a license obtainment process (in the case where a transaction log is recorded on the transaction log database 902 when the user terminal 103 and the license server 101 start communication) in the embodiment of the present invention.

An overview of a process of the user terminal 103 obtaining a license 200 from the license server 101 in this embodiment is described first, with reference to FIGS. 12 and 13.

FIG. 12 shows an overview of a license obtainment process in the case where a log is not recorded on the transaction log database 902 when the user terminal 103 and the license server 101 start communication.

FIG. 13 shows an overview of a license obtainment process in the case where a log is recorded on the transaction log database 902 when the user terminal 103 and the license server 101 start communication.

Communication between the user terminal 103 and the license server 101 is made up of a request message which is issued from the user terminal 103 and a response message which is returned from the license server 101 in response to the request message. A pair of a request and a response is called a phase. As shown in FIGS. 12 and 13, there are five types of phases. An overview of each phase is described below.

An authentication phase P1 is described first. The authentication phase P1 is a phase for mutual authentication, which is performed first and only once after a session is established between the user terminal 103 and the license server 101. In the authentication phase P1, the user terminal 103 transmits authentication information A which is necessary for the license server 101 to authenticate the user terminal 103, to the license server 101 as an initial request message. After verifying authentication information A, the license server 101 transmits authentication information B which is necessary for the user terminal 103 to authenticate the license server 101, to the user terminal 103. The user terminal 103 verifies authentication information B. This completes the description of the authentication phase P1.

An authentication and request phase P2 is described next. The authentication and request phase P2 is a phase that is performed only once following the authentication phase P1, in the case where a log is not recorded on the transaction log database 902 at the beginning of the authentication phase P1. In the authentication and request phase P2, the user terminal 103 transmits a license request message, authentication information C which is necessary for determining mutual authentication, and transaction identification flag T, to the license server 101. Transaction identification flag T transmitted here is set to an initial value ("0" in this embodiment). The license server 101 judges that a new transaction begins. When there is a previous transaction which has been interrupted, the license server 101 performs a process (hereafter referred to as a "cancel process") of returning the license database 301 and the transaction log database 502 to a state before the execution of the interrupted transaction. After this, the license server 101 transmits a response message including the license 200, to the user terminal 103 as a response to the request message. Upon receiving the response message, the user terminal 103 proceeds to a commit phase P4 by transmitting a commit message, in the case of not performing consecutive transactions. In the case of performing consecutive transactions, on the other hand, the user terminal 103 proceeds to a request phase P3 without transmitting a commit message.

The request phase P3 is a phase that occurs when two or more transactions are processed in the same session. That is, the request phase P3 is used when a license request is made more than once. The request phase P3 is performed for the number of necessary transactions. In the request phase P3, instead of transmitting a commit message, the user terminal 103 transmits a license request message and transaction identification flag T that is inverted in value. When receiving transaction identification flag T that is inverted in value from transaction identification flag T received in its preceding request phase P3, the license server 101 performs the commit process for the preceding transaction. After the last request phase P3 is completed, the user terminal 103 proceeds to the commit phase P4.

The commit phase P4 is a phase for determining, after all transactions end, the completion of the transactions in the license server 101. In the commit phase P4, the user terminal 103 transmits a commit message to the license serve 101. Upon receiving the commit message, the license server 101 performs the commit process.

An authentication and commit phase P5 is described below. The authentication and commit phase P5 is a phase that is performed only once following the authentication phase P1, in the case where a log is recorded on the transaction log database 902 at the beginning of the authentication phase P1. In the authentication and commit phase P5, the user terminal 103 transmits a commit message, authentication information C which is necessary for determining mutual authentication, and transaction identification flag T, to the license server 101. The license server 101 performs the commit process or the cancel process, depending on the value of transaction identification flag T.

This completes the description of the overview of the processes performed in the five phases when the user terminal 103 obtains the license 200 from the license server 101 in this embodiment.

The following describes the process performed in each of the communication phases P1 to P5, in more detail.

Figure 14:
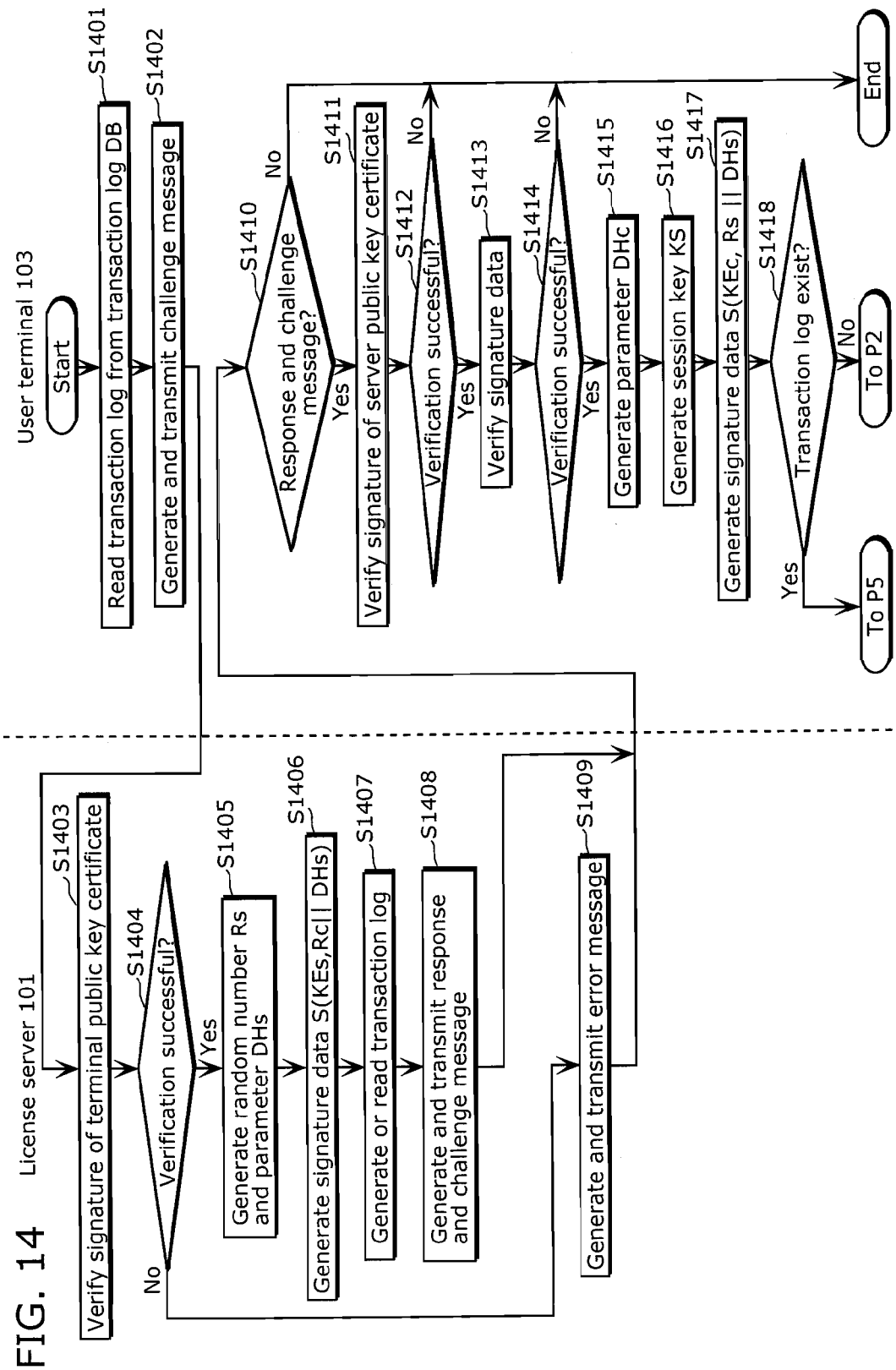
FIG. 14 is a flowchart showing a process performed in an authentication phase P1 in the embodiment of the present invention.

The process performed in the authentication phase P1 is described first, with reference to a flowchart shown in FIG. 14.

Step S1401: When instructed by user β to obtain the license 200 from the license server 101, the secure communication control unit 901 in the secure communication unit 803 references the transaction log database 902, and searches for a log corresponding to the designated license server 101. When the corresponding log exists, the secure communication control unit 901 reads the log onto the nonvolatile memory managed by the secure communication control unit 901 itself, as the transaction log 1000.

Step S1402: The secure communication control unit 901 generates a challenge message that includes random number Rc generated by the random number generation unit 904 and the terminal public key certificate stored in the unique information storage unit 903, and transmits the challenge message to the license server 101 via the communication unit 906.

Step S1403: Upon receiving the challenge message including random number Rc and the terminal public key certificate from the user terminal 103 via the communication unit 506, the secure communication control unit 501 in the secure communication unit 302 in the license server 101 inputs the terminal public key certificate and the public key certificate of the certificate authority which is stored in the unique information storage unit 503 to the cryptographic processing unit 505, to perform signature verification on the terminal public key certificate.

Step S1404: When the signature verification in Step S1403 results in a failure, the secure communication control unit 501 proceeds to Step S1409. When the signature verification in Step S1403 results in a success, the secure communication control unit 501 proceeds to Step S1405.

Step S1405: The secure communication control unit 501 has the random number generation unit 504 generate random numbers Rs and Rs2, and has the cryptographic processing unit 505 generate Diffie-Hellman parameter DHs with random number Rs2 as an input.

Step S1406: The secure communication control unit 501 has the cryptographic processing unit 505 sign concatenation data (Expression 1) of random number Rc received from the user terminal 103 and DHs generated in Step S1405, by using secret key KEs unique to the license server 101, to thereby generate a signature (Expression 2).

$$Rc \| DHs \quad \text{(Expression 1).}$$

$$S(KEs, Rc \| DHs) \quad \text{(Expression 2).}$$

Here, the sign "∥" denotes concatenation of data, and S(A, B) denotes an operation of signing data B using secret key A according to signature generation algorithm S.

Step S1407: The secure communication control unit 501 references the transaction log database 502, and searches for a log corresponding to the user terminal 103 in communication with the license server 101. When the corresponding log exists, the secure communication control unit 501 reads the log onto the nonvolatile memory managed by the secure communication control unit 501 itself, as the transaction log 600. The secure communication control unit 501 also deletes the read log from the transaction log database 502. In this transaction log 600, the transaction-in-process existence 601 is set to "exist", and the rollback requirement 603 is set to "required". When the corresponding log does not exist in the transaction log database 502, the secure communication control unit 501 generates the transaction log 600 on the managed nonvolatile memory. In this transaction log 600, the terminal ID 401 is set to an ID of the user terminal 103 in communication with the license server 101, the transaction-in-process existence 601 is set to "not exist", the transaction-in-process identification flag 602 is set to "0", and the rollback requirement 603 is set to "not required".

Step S1408: The secure communication control unit 501 generates a response and challenge message that includes random number Rs generated in Step S1405, Diffie-Hellman parameter DHs, the server public key certificate stored in the unique key information storage unit 503, and the signature (Expression 2) generated in Step S1406, and transmits the response and challenge message to the user terminal 103 via the communication unit 506.

Step S1409: The secure communication control unit 501 generates an error message, and transmits the error message to the user terminal 103 via the communication unit 506.

Step S1410: The secure communication control unit 901 judges whether or not the message received from the license server 101 is the response and challenge message. When the message received from the license server 101 is the response and challenge message, the secure communication control unit 901 proceeds to Step S1411. When the message received from the license server 101 is not the response and challenge message, the secure communication control unit 901 terminates the process.

Step S1411: The secure communication control unit 901 inputs the public key certificate of the certificate authority stored in the unique information storage unit 903 and the server public key certificate included in the response and challenge message to the cryptographic processing unit 905, to perform signature verification on the server public key certificate.

Step S1412: When the signature verification in Step S1411 results in a failure, the secure communication control unit 901 terminates the process. When the signature verification in Step S1411 results in a success, the secure communication control unit 901 proceeds to Step S1413.

Step S1413: The secure communication control unit 901 generates concatenation data (Expression 3) of random number Rc generated in Step S1402 and DHs included in the response and challenge message. The secure communication control unit 901 inputs the concatenation data (Expression 3), the signature data (Expression 2) included in the response and challenge message, and the server public key certificate to the cryptographic processing unit 905, to verify the signature data (Expression 2).

$$Rc \| DHs \quad \text{(Expression 3).}$$

Step S1414: When the signature verification in Step S1413 results in a failure, the secure communication control unit 901 terminates the process. When the signature verification in Step S1413 results in a success, it can be confirmed that the party in communication with the user terminal 103 is the license server 101 itself (party-in-communication authentication). In this case, the secure communication control unit 901 proceeds to Step S1415.

Step S1415: The secure communication control unit 901 has the random number generation unit 904 generate random number Rc2, and has the cryptographic processing unit 905 generate Diffie-Hellman parameter DHc with random number Rc2 as an input.

Step S1416: The secure communication control unit 901 has the cryptographic processing unit 905 generate session key KS, from DHs included in the response and challenge message and Rc2 generated in Step S1415.

Step S1417: The secure communication control unit 901 has the cryptographic processing unit 905 sign concatenation data (Expression 4) of random number Rs included in the response and challenge message and DHc generated in Step S1415, by using secret key KEc unique to the user terminal 103, to thereby generate a signature (Expression 5).

$$Rs\|DHc \qquad \text{(Expression 4).}$$

$$S(KEc, Rs\|DHc) \qquad \text{(Expression 5).}$$

Step S1418: The secure communication control unit 901 references the transaction log database 902, and searches for a log corresponding to the license server 101 in communication with the user terminal 103. When the log corresponding to the license server 101 in communication exists, the secure communication control unit 901 proceeds to the authentication and commit phase P5. When the log corresponding to the license server 101 in communication does not exist, the secure communication control unit 901 proceeds to the authentication and request phase P2.

This completes the description of the process performed in the authentication phase P1.

Figure 15:
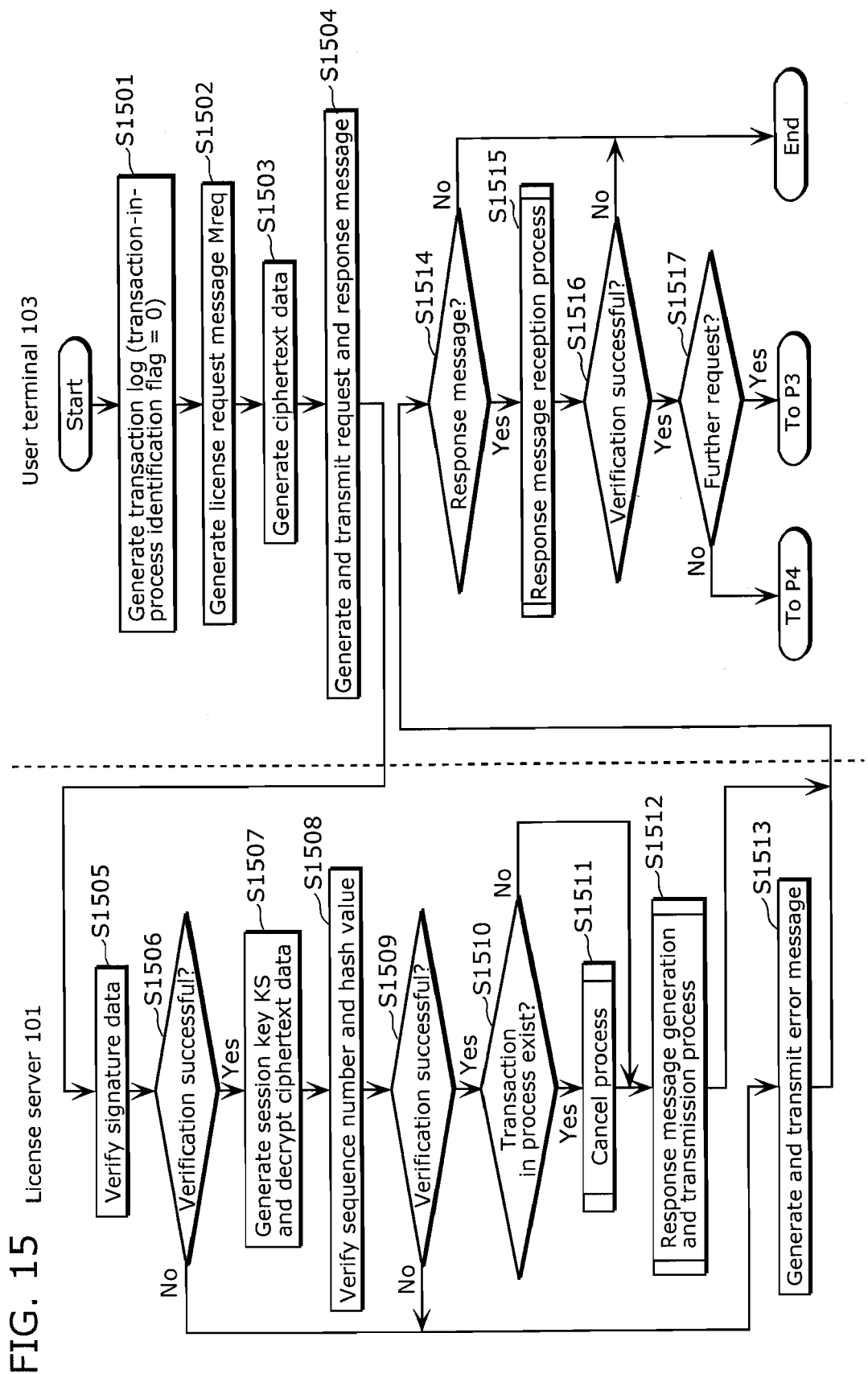
FIG. 15 is a flowchart showing a process performed in an authentication and request phase P2 in the embodiment of the present invention.

The following describes the process performed in the authentication and request phase P2, with reference to a flowchart shown in FIG. 15.

Step S1501: The secure communication control unit 901 generates the transaction log 1000 on the nonvolatile memory managed by the secure communication control unit 901 itself. In this transaction log 1000, the server ID 1001 is set to an ID of the license server 101 in communication with the user terminal 103, and the transaction-in-process identification flag 602 is set to an initial value ("0" in this embodiment).

Step S1502: The license obtainment unit 804 generates license obtainment request message Mreq. License obtainment request message Mreq includes a license ID 201 of the license 200 requested by the user terminal 103.

Step S1503: The secure communication control unit 901 concatenates sequence number Seq, transaction identification flag T, license obtainment request message Mreq generated in Step S1502, and hash value h corresponding to sequence number Seq, transaction identification flag T, and license obtainment request message Mreq, and generates ciphertext data (Expression 6) by encrypting the concatenation data using session key KS.

$$E(KS, Seq\|T\|Mreq\|h) \qquad \text{(Expression 6).}$$

In Expression 6, E(X, Y) denotes an operation of encrypting data Y using encryption key X according to encryption algorithm E.

Here, sequence number Seq is set to "0". Sequence number Seq is increased by 1 at each instance of message transmission and reception in the same session. Meanwhile, transaction identification flag T is set to the value of the transaction-in-process identification flag 602 in the transaction log 1000.

Step S1504: The secure communication control unit 901 generates a request and response message that includes DHc generated in Step S1415, the signature (Expression 5) generated in Step S1417, and the ciphertext data (Expression 6) generated in Step S1503, and transmits the request and response message to the license server 101 via the communication unit 906.

Step S1505: Upon receiving the request and response message including Diffie-Hellman parameter DHc, the signature data, and the ciphertext data from the user terminal 103 via the communication unit 506, the secure communication control unit 501 in the secure communication unit 302 in the license server 101 generates concatenation data (Expression 7) of random number Rs generated in Step S1405 and DHc, and inputs the concatenation data (Expression 7), the signature data, and the terminal public key certificate to the cryptographic processing unit 505, to verify the signature data.

$$Rs\|DHc \qquad \text{(Expression 7).}$$

Step S1506: When the signature verification in Step S1505 results in a failure, the secure communication control unit 501 proceeds to Step S1513. When the signature verification in Step S1505 results in a success, the secure communication control unit 501 proceeds to Step S1507.

Step S1507: The secure communication control unit 501 has the cryptographic processing unit 505 generate session key KS, from DHc included in the request and response message and Rs2 generated in Step S1405. The secure communication control unit 501 then inputs the ciphertext data included in the request and response message and generated session key KS to the cryptographic processing unit 505, to decrypt the ciphertext data.

Step S1508: The secure communication control unit 501 verifies sequence number Seq and hash value h.

Step S1509: When the verification in Step S1508 results in a failure, the secure communication control unit 501 proceeds to Step S1513. When the verification in Step S1508 results in a success, the secure communication control unit 501 proceeds to Step S1510.

Step S1510: The secure communication control unit 501 checks the value of the transaction-in-process existence 601 in the transaction log 600. When the value of the transaction-in-process existence 601 is "exist", the secure communication control unit 501 proceeds to Step S1511. When the value of the transaction-in-process existence 601 is "not exist", the secure communication control unit 501 proceeds to Step S1512.

Step S1511: The secure communication control unit 501 executes a cancel process which will be described later.

Step S1512: The secure communication control unit 501 executes a response message generation and transmission process which will be described later.

Step S1513: The secure communication control unit 501 generates an error message, and transmits the error message to the user terminal 103 via the communication unit 506.

Step S1514: The secure communication control unit 901 judges whether or not the message received from the license server 101 is a response message. When the message received from the license server 101 is the response message, the secure communication control unit 901 proceeds to Step S1515. When the message received from the license server 101 is not the response message, the secure communication control unit 901 terminates the process.

Step S1515: The secure communication control unit 901 executes a response message reception process which will be described later.

Step S1516: When verification of sequence number Seq and hash value h results in a success in the response message reception process of Step S1515, the secure communication control unit 901 proceeds to Step S1517. When the verification of sequence number Seq and hash value h results in a failure, the secure communication control unit 901 terminates the process.

Step S1517: The secure communication control unit 901 proceeds to the request phase P3 in the case of further making a license request, and proceeds to the commit phase P4 in the case of not making a further license request.

This completes the description of the process performed in the authentication and request phase P2.

Figure 16:
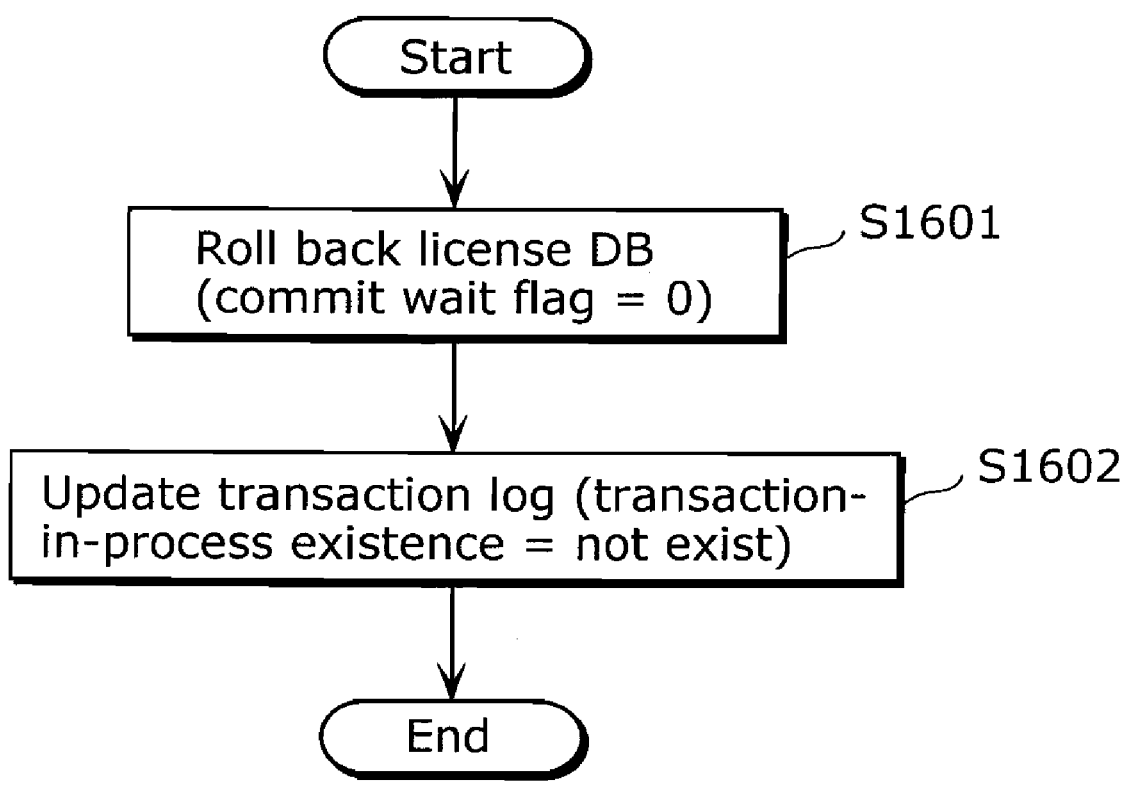
FIG. 16 is a flowchart showing a cancel process in the embodiment of the present invention.

The following describes the cancel process of Step S1511 shown in FIG. 15 in detail, with reference to a flowchart shown in FIG. 16.

Step S1601: The secure communication control unit 501 instructs the license issuance unit 303 to perform a rollback process of the license database 301. This rollback instruction includes the terminal ID 401 of the user terminal 103 in communication with the license server 101. Upon receiving the instruction, the license issuance unit 303 references the license database 301, searches information relating to the terminal ID 401 included in the rollback instruction for information whose commit wait flag 403 is "1", and changes the commit wait flag 403 to "0".

Step S1602: The secure communication control unit 501 sets the transaction-in-process existence 601 in the transaction log 600, to "not exist".

The above describes the case where the license database 301 is rolled back in the cancel process, but the present invention is not limited to such. In the case where other information that requires rollback is managed/updated, that information may be rolled back.

This completes the description of the cancel process.

Figure 17:
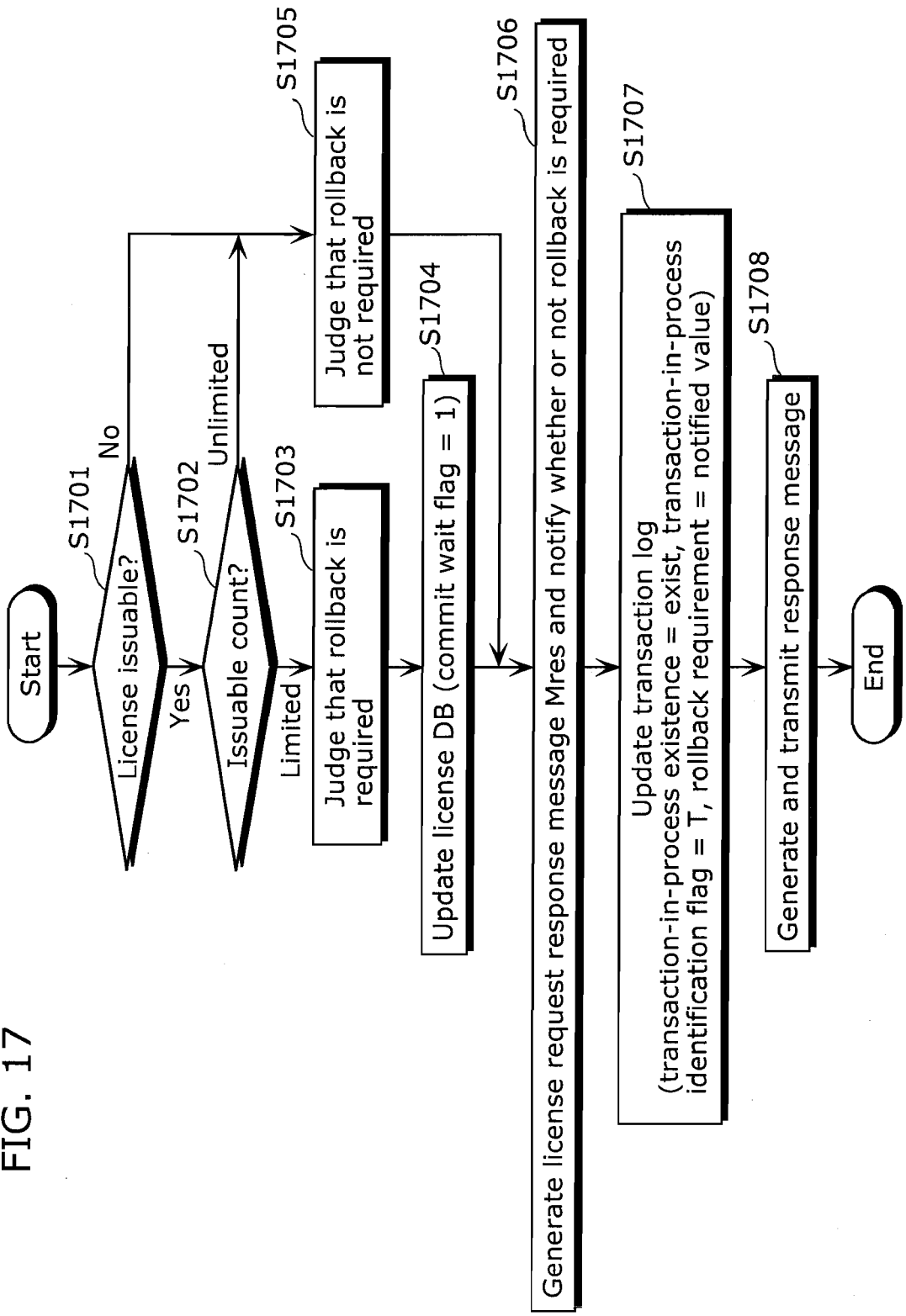
FIG. 17 is a flowchart showing a response message generation and transmission process in the embodiment of the present invention.

The following describes the response message generation and transmission process of Step S1512 shown in FIG. 15 in detail, with reference to a flowchart shown in FIG. 17.

Step S1701: The secure communication control unit 501 outputs decrypted license obtainment request message Mreq to the license issuance unit 303, to notify of the reception of the new license obtainment request. Upon receiving the notification, the license issuance unit 303 references the license database 301, and judges whether or not the license 200 can be issued. When the issuable count 402 of the license 200 requested by license obtainment request message Mreq is equal to or more than 1 and the commit wait flag 403 is "0", the license issuance unit 303 judges that the license 200 can be issued. When the license 200 is judged as issuable, the license issuance unit 303 proceeds to Step S1702. When the license 200 is judged as not issuable, the license issuance unit 303 proceeds to Step S1705.

Step S1702: The license issuance unit 303 judges whether or not the issuable count 402 is limited. When the issuable count 402 is limited, the license issuance unit 303 proceeds to Step S1703. When the issuable count 402 is not limited, the license issuance unit 303 proceeds to Step S1705.

Step S1703: The license issuance unit 303 judges that the license database 301 needs to be rolled back, in the case where the user terminal 103 fails to receive the license 200 which is to be issued.

Step S1704: The license issuance unit 303 changes the commit wait flag 403 of the license 200 which is to be issued, to "1".

Step S1705: The license issuance unit 303 judges that the license database 301 does not need to be rolled back, in the case where the user terminal 103 fails to receive the license 200 which is to be issued.

Step S1706: The license issuance unit 303 generates license request response Mres. In detail, when the license 200 is judged as issuable in Step S1701, the license issuance unit 303 generates license request response message Mres that includes the license 200. When the license 200 is judged as not issuable in Step S1701, the license issuance unit 303 generates license request response Mres notifying that the license 200 cannot be issued. The license issuance unit 303 outputs generated license request response Mres and the result of the judgment of Step S1703 or S1705 as to whether or not rollback is required, to the secure communication control unit 501.

Step S1707: The secure communication control unit 501 sets, in the transaction log 600, the transaction-in-process existence 601 to "exist", the transaction-in-process identification flag 602 to the value of transaction identification flag T transmitted form the user terminal 103, and the rollback requirement 603 to the value notified in Step S1706.

Step S1708: The secure communication control unit 501 concatenates sequence number Seq, transaction identification flag storage instruction TR, license obtainment request response message Mreq generated in Step S1706, and hash value h corresponding to sequence number Seq, transaction identification flag storage instruction TR, and license obtainment request response message Mreq, and generates ciphertext data (Expression 8) by encrypting the concatenation data using session key KS. Here, transaction identification flag storage instruction TR is information indicating whether or not the transaction log 1000 needs to be recorded on the transaction log database 902 in the user terminal 103. When the rollback requirement 603 in the transaction log 600 is "required", the secure communication control unit 501 sets transaction identification flag storage instruction TR to "recording required". When the rollback requirement 603 in the transaction log 600 is "not required", the secure communication control unit 501 sets transaction identification flag storage instruction TR to "recording not required". By using transaction identification flag storage instruction TR to notify whether or not recording to the transaction log database 902 is required, unnecessary recording to the transaction log database 902 can be suppressed.

$$E(KS, Seq\|TR\|Mres\|h) \tag{Expression 8}.$$

After this, the secure communication control unit 501 generates a response message including the generated ciphertext data (Expression 8), and transmits the response message to the user terminal 103 via the communication unit 506.

It should be noted here that the response message transmitted from the license server 101 may also include a transaction identification flag retention time limit.

FIGS. 28 and 29 are reference diagrams of the case where the retention time limit is added to the transaction log 600. A retention time limit 2801 and a retention time limit 2802 are added respectively to the transaction log 600 and the transaction log database 502 managed in the license server, and a retention time limit 2901 and a retention time limit 2902 are added respectively to the transaction log 1000 and the transaction log database 902 managed in the user terminal. Examples of setting the retention time limit include setting a duration specific to the system (such as one month after log recording), and setting the time limit depending on the usage condition (such as by the end of March when the license can be issued until March). Conventionally, there is a problem of being unable to delete a transaction log, when the license server 101 or the user terminal 103 stops operation even though there is an interrupted process. However, the provision of the retention time limit enables the license server 101 and the user terminal 103 to delete the transaction log after the retention time limit. This makes it possible to adequately avoid a situation where the transaction log permanently remains in the license server 101 and the user terminal 103.

The above describes the case where the license server 101 judges whether or not the transaction log 1000 needs to be recorded to the transaction log database 902 in the user terminal 103, and notifies the user terminal 103 of the judgment result by using transaction identification flag storage instruction TR in the response message. This recording requirement judgment may also be made according to the usage condition 204 included in the license 200 to be transmitted, whether or not to update information managed in the license server 101, and the like. As one example, the license server 101 may judge that the recording is required when the usage condition 204 of the license 200 is stateful, and judge that the recording is not required when the usage condition 204 of the license 200 is stateless. As another example, the license server 101 may judge that the recording is required when the license server 101 updates the managed information as a result of the issuance of the license 200, and judge that the recording is not required when the license server 101 does not update the managed information. The information managed in the license server 101 and updated as a result of the issuance of the license 200 may be the number of issuances of the license 200, an issuance history of the license 200, and the like.

The above describes the case where the license server 101 judges whether or not the transaction log 1000 needs to be recorded to the transaction log database 902 in the user terminal 103, but the license server 101 may not necessarily perform the judgment. For example, the user terminal 103 may perform the judgment based on the usage condition 204 of the license 200 and the like.

This completes the description of the response message generation and transmission process.

Figure 18:
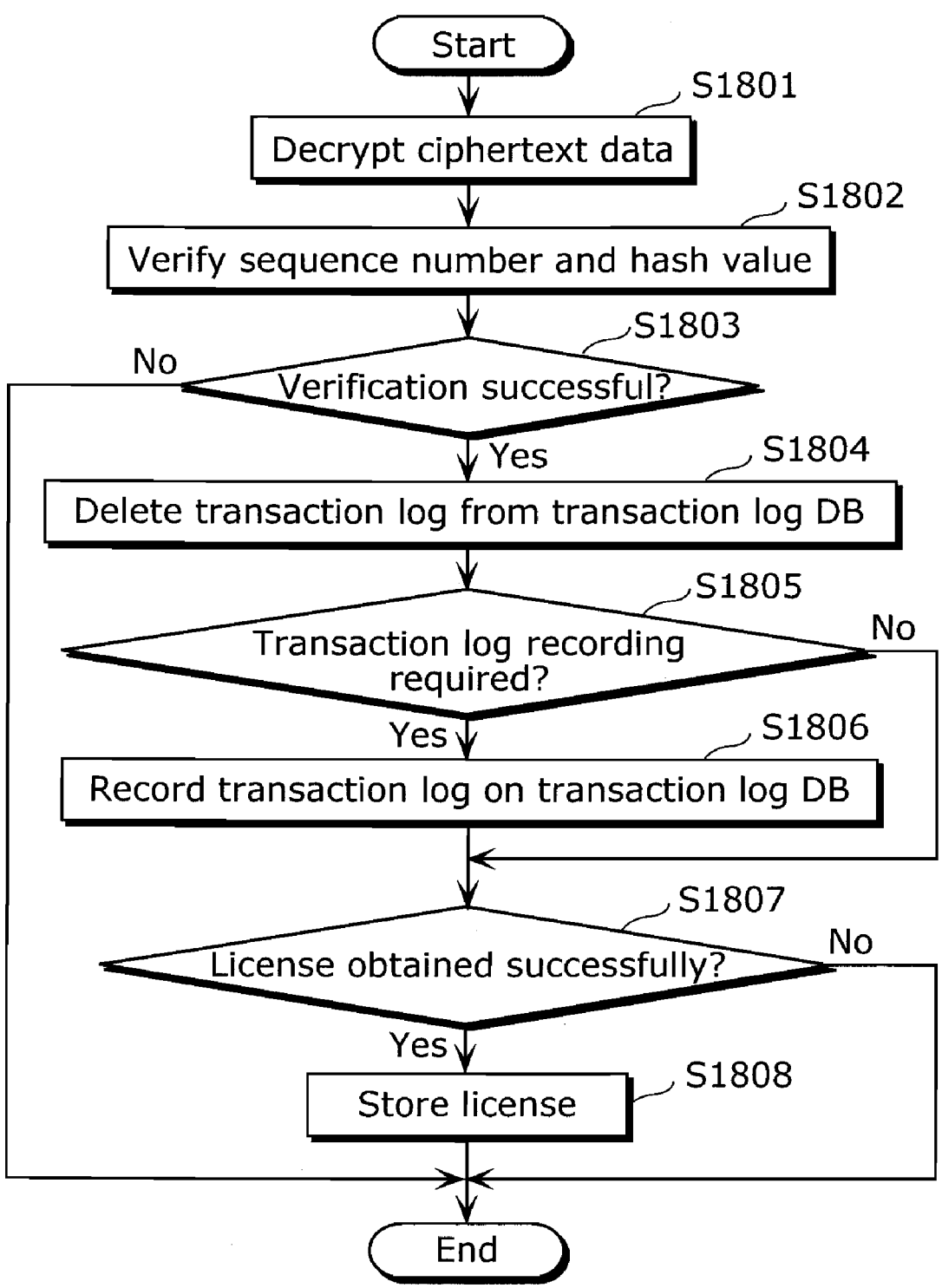
FIG. 18 is a flowchart showing a response message reception process in the embodiment of the present invention.

The following describes the response message reception process of Step S1515 shown in FIG. 5 in detail, with reference to a flowchart shown in FIG. 18.

Step S1801: The secure communication control unit 901 inputs the ciphertext data included in the response message and session key KS to the cryptographic processing unit 905, to decrypt the ciphertext data.

Step S1802: The secure communication control unit 901 verifies sequence number Seq and hash value h.

Step S1803: When the verification in Step S1802 results in a failure, the secure communication control unit 901 terminates the process. When the verification in Step S1802 results in a success, the secure communication control unit 901 proceeds to Step S1804.

Step S1804: When a log corresponding to the license server 101 in communication with the user terminal 103 exists in the transaction log database 902, the secure communication control unit 901 deletes the log.

Step S1805: The secure communication control unit 901 references transaction identification flag storage instruction TR included in the data decrypted in Step S1801, to judge whether or not the transaction log 1000 needs to be recorded to the transaction log database 902. When the recording is required, the secure communication control unit 901 proceeds to Step S1806. When the recording is not required, the secure communication control unit 901 proceeds to Step S1807.

Step S1806: The secure communication control unit 901 records the transaction log 1000 to the transaction log database 902.

Step S1807: The secure communication control unit 901 outputs license obtainment request response message Mreq included in the ciphertext data decrypted in Step S1801, to the license obtainment unit 804. The license obtainment unit 804 references license obtainment request response message Mreq, to judge whether or not the obtainment of the license 200 is successful. When the obtainment of the license 200 is successful, the license obtainment unit 804 proceeds to Step S1808. From this time, the obtained license 200 can be used in the user terminal 103. When the obtainment of the license 200 is not successful, the license obtainment unit 804 terminates the process.

Step S1808: The license obtainment unit 804 stores the license 200 in the license storage unit 801.

This completes the description of the response message reception process.

Figure 19:
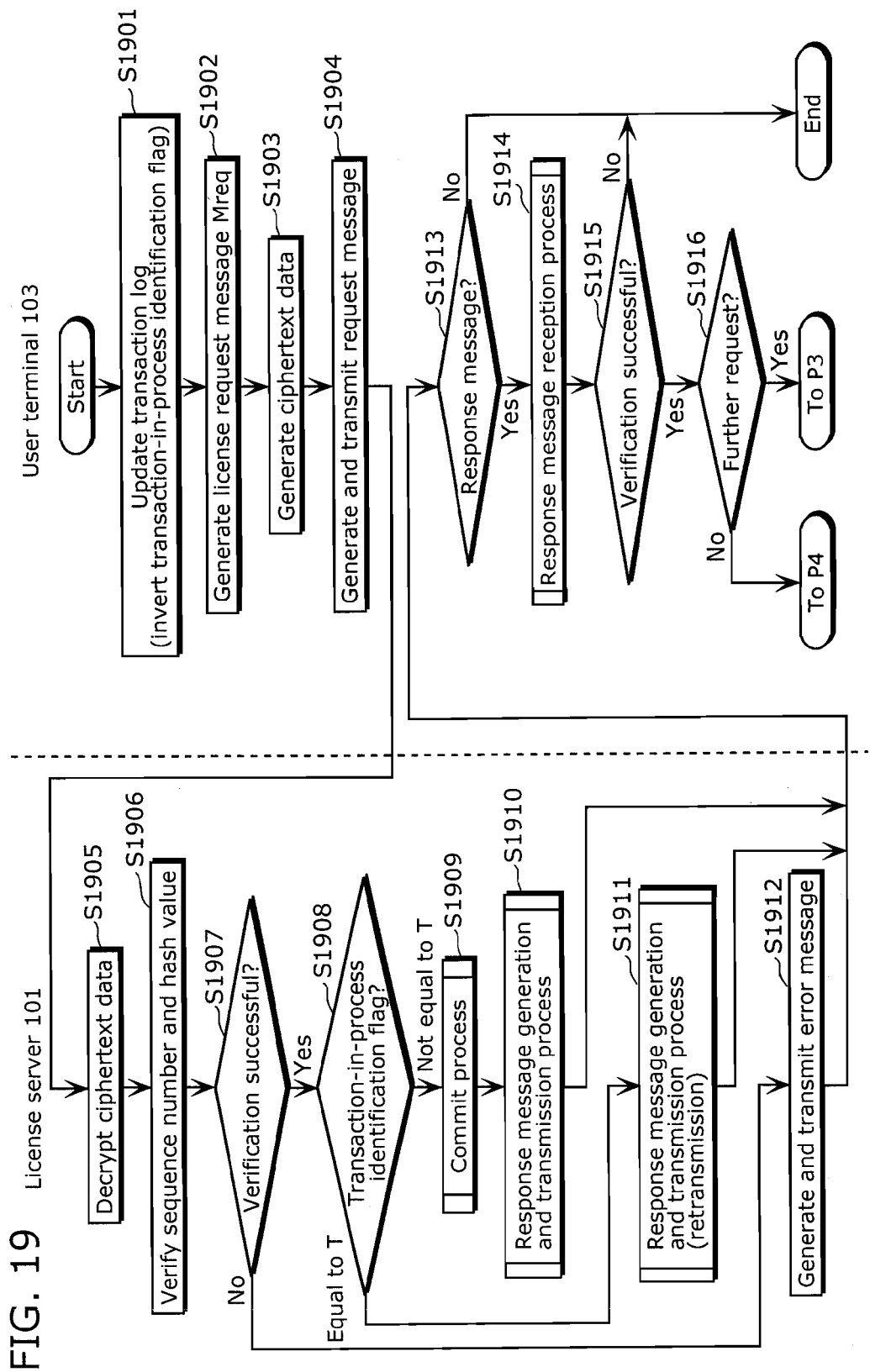
FIG. 19 is a flowchart showing a process performed in a request phase P3 in the embodiment of the present invention.

The following describes the process performed in the request phase P3, with reference to a flowchart shown in FIG. 19.

Step S1901: The secure communication control unit 901 inverts the value of the transaction-in-process identification flag 602 in the transaction log 1000 managed on the nonvolatile memory.

Step S1902: The license obtainment unit 804 generates license obtainment request message Mreq. License obtainment request message Mreq includes a license ID 201 of a requested license 200.

Step S1903: The secure communication control unit 901 concatenates sequence number Seq, transaction identification flag T, license obtainment request message Mreq generated in Step S1902, and hash value h corresponding to sequence number Seq, transaction identification flag T, and license obtainment request message Mreq, and generates ciphertext data (Expression 6) by encrypting the concatenation data using session key KS. Transaction identification flag T is set to the value of the transaction-in-process identification flag 602 in the transaction log 1000.

Step S1904: The secure communication control unit 901 generates a request message that includes the ciphertext data (Expression 6) generated in Step S1903, and transmits the request message to the license server 101 via the communication unit 906.

Step S1905: Upon receiving the request message, the secure communication control unit 501 inputs the ciphertext data included in the request message and session key KS to the cryptographic processing unit 505, to decrypt the ciphertext data.

Step S1906: The secure communication control unit 501 verifies sequence number Seq and hash value h.

Step S1907: When the verification in Step S1906 results in a failure, the secure communication control unit 501 proceeds to Step S1912. When the verification in Step S1906 results in a success, the secure communication control unit 501 proceeds to Step S1908.

The secure communication control unit 501 checks the value of the transaction-in-process identification flag 602 in the transaction log 600 and the value of transaction identification flag T included in the ciphertext data decrypted in Step S1905. When transaction identification flag T and the transaction-in-process identification flag 602 match, the secure communication control unit 501 proceeds to Step S1911. When transaction identification flag T and the transaction-in-process identification flag 602 do not match, the secure communication control unit 501 proceeds to Step S1909.

Step S1909: The secure communication control unit 501 executes a commit process which will be described later.

Step S1910: The secure communication control unit 501 executes the response message generation and transmission process described above.

Step S1911: The secure communication processing unit 501 executes a response message generation and transmission process (retransmission) which will be described later.

Step S1912: The secure communication control unit 501 generates an error message, and transmits the error message to the user terminal 103 via the communication unit 506.

Step S1913: The secure communication control unit 901 judges whether or not the message received from the license server 101 is a response message. When the message received from the license server 101 is the response message, the secure communication control unit 901 proceeds to Step S1914. When the message received from the license server 101 is not the response message, the secure communication control unit 901 terminates the process.

Step S1914: The secure communication control unit 901 executes the response message reception process described above.

Step S1915: When the verification of sequence number Seq and hash value h results in a success in the response message reception process of Step S1914, the secure communication control unit 901 proceeds to Step S1916. When the verification of sequence number Seq and hash value h results in a failure, the secure communication control unit 901 terminates the process.

Step S1916: The secure communication control unit 901 executes the process of the request phase P3 again, in the case of further making a license request. The secure communication control unit 901 proceeds to the process of the commit phase P4, in the case of making no more license request.

This completes the description of the process performed in the request phase P3.

Figure 20:
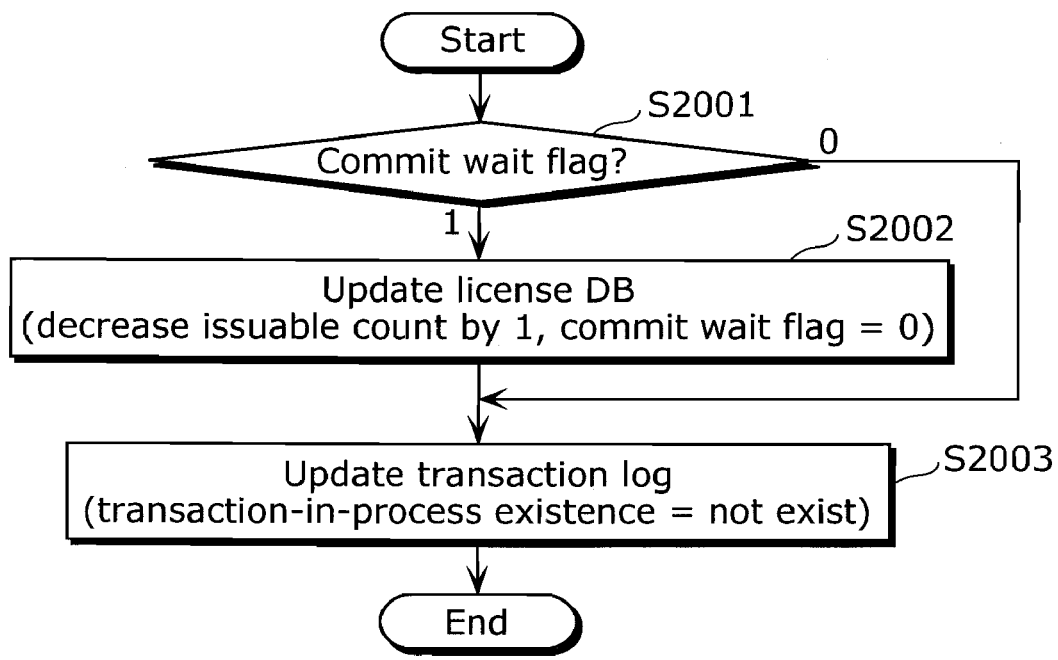
FIG. 20 is a flowchart showing a commit process in the embodiment of the present invention.

The following describes the commit process of Step S1910 shown in FIG. 19 in detail, with reference to a flowchart shown in FIG. 20.

Step S2001: The secure communication control unit 501 instructs the license issuance unit 303 to perform a commit process. This commit instruction includes the terminal ID 401 of the user terminal 103 in communication with the license server 101. Upon receiving the instruction, the license issuance unit 303 references the license database 301, and searches information relating to the terminal ID 401 included in the commit instruction for a license 200 whose commit wait flag 403 is "1". When the license 200 whose commit wait flag 403 is "1" is detected as a result of the search, the license issuance unit 303 proceeds to Step S2002. When no license 200 whose commit wait flag 403 is "1" is detected, the license issuance unit 303 proceeds to Step S2003.

Step S2002: The license issuance unit 303 changes the commit wait flag 403 of the license 200 detected in Step S2001 to "0", and decreases the issuable count 402 by 1.

Step S2003: The secure communication control unit 501 sets the transaction-in-process existence 601 in the transaction log 600, to "not exist".

The above describes the case where the information included in the license database 301 is updated in Step S2002, but the present invention is not limited to this. In the case where the license server 101 manages other information that needs to be updated as a result of the issuance of the license 200, that information may be updated.

This completes the description of the commit process.

Figure 21:
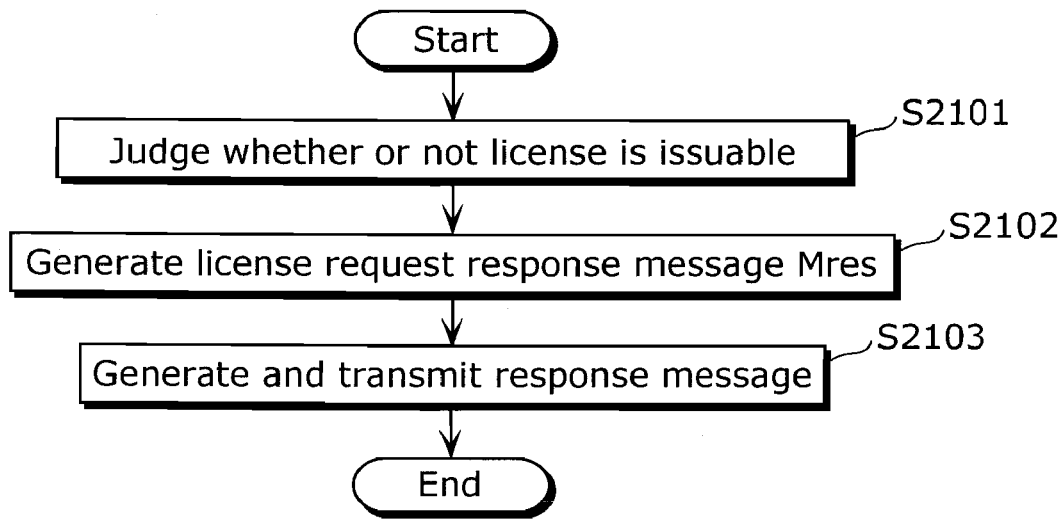
FIG. 21 is a flowchart showing a response message generation and transmission process (retransmission) in the embodiment of the present invention.

The following describes the response message generation and transmission process (retransmission) of Step S1911 shown in FIG. 19 in detail, with reference to a flowchart shown in FIG. 21.

Step S2101: The secure communication control unit 501 outputs decrypted license obtainment request message Mreq to the license issuance unit 303, to notify of the reception of the retransmitted license obtainment request. Upon receiving the notification, the license issuance unit 303 references the license database 301, and judges whether or not the license 200 can be issued. When the issuable count 402 of the license 200 requested by license obtainment request message Mreq is equal to or more than 1, the license issuance unit 303 judges that the license 200 can be issued.

Step S2102: The license issuance unit 303 generates license request response Mres. In detail, when the license 200 is judged as issuable in Step S2101, the license issuance unit 303 generates license request response message Mres including the license 200. When the license 200 is judged as not issuable in Step S2101, the license issuance unit 303 generates license request response Mres notifying that the license 200 cannot be issued. The license issuance unit 303 outputs generated license request response Mres to the secure communication control unit 501.

Step S2103: The secure communication control unit 501 concatenates sequence number Seq, transaction identification flag storage instruction TR, license obtainment request response message Mreq generated in Step S2102, and hash value h corresponding to sequence number Seq, transaction identification flag storage instruction TR, and license obtainment request response message Mreq, and generates ciphertext data (Expression 8) by encrypting the concatenation data using session key KS. Here, when the rollback requirement 603 in the transaction log 600 is "required", the secure communication control unit 501 sets transaction identification flag storage instruction TR to "recording required". When the rollback requirement 603 is "not required", the secure communication control unit 501 sets transaction identification flag storage instruction TR to "recording not required". The secure communication control unit 501 then generates a response message including the generated ciphertext data (Expression 8), and transmits the response message to the user terminal 103 via the communication unit 506.

This completes the description of the response message generation and transmission process (retransmission).

Figure 22:
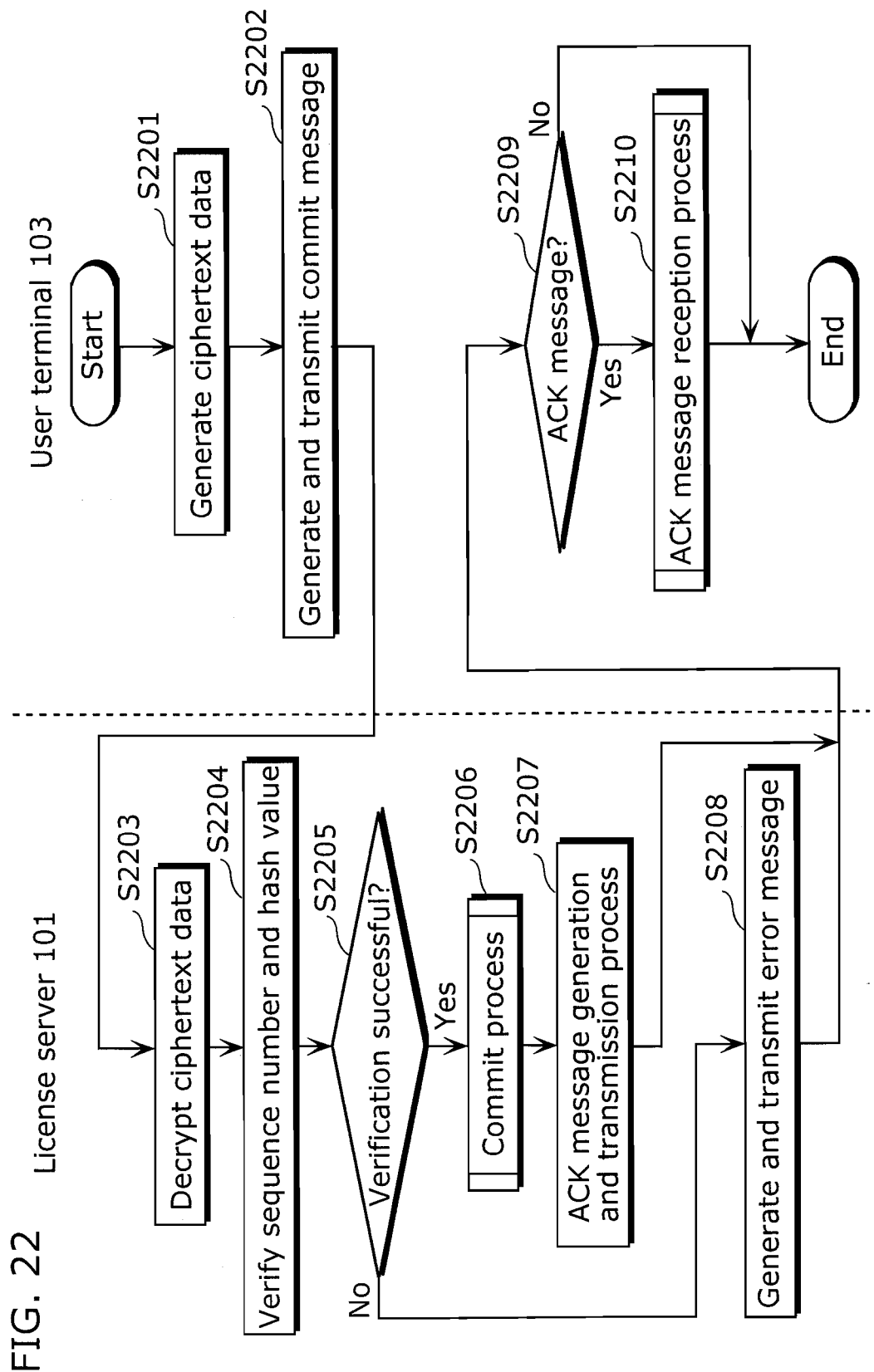
FIG. 22 is a flowchart showing a process performed in a commit phase P4 in the embodiment of the present invention.

The following describes the process performed in the commit phase P4, with reference to a flowchart shown in FIG. 22.

Step S2201: The secure communication control unit 901 concatenates sequence number Seq, transaction identification flag T, commit command C, and hash value h corresponding to sequence number Seq, transaction identification flag T, and commit command C, and generates ciphertext data (Expression 9) by encrypting the concatenation data using session key KS. Here, transaction identification flag T is set to the value of the transaction-in-process identification flag 602 in the transaction log 1000.

$$E(KS, Seq\|T\|C\|h) \qquad \text{(Expression 9)}.$$

Step S2202: The secure communication control unit 901 generates a commit message that includes the ciphertext data (Expression 9) generated in Step S2201, and transmits the commit message to the license server 101 via the communication unit 906.

Step S2203: Upon receiving the commit message, the secure communication control unit 501 inputs the ciphertext data included in the commit message and session key KS to the cryptographic processing unit 505, to decrypt the ciphertext data.

Step S2204: The secure communication control unit 501 verifies sequence number Seq and hash value h.

Step S2205: When the verification in Step S2204 results in a failure, the secure communication control unit 501 proceeds to Step S2208. When the verification in Step S2204 results in a success, the secure communication control unit 501 proceeds to Step S2206.

Step S2206: The secure communication control unit 501 executes the commit process described above.

Step S2207: The secure communication control unit 501 concatenates sequence number Seq, transaction identification flag T, ACK command A, and hash value h corresponding to sequence number Seq, transaction identification flag T, and ACK command A, and generates ciphertext data (Expression 10) by encrypting the concatenation data using session key KS. The secure communication control unit 501 then generates an ACK message that includes the generated ciphertext data (Expression 10), and transmits the ACK message to the user terminal 103 via the communication unit 506. Here, transaction identification flag T is set to the value of the transaction-in-process identification flag 602 in the transaction log 600.

$$E(KS, Seq\|T\|A\|h) \qquad \text{(Expression 10)}.$$

Step S2208: The secure communication control unit 501 generates an error message, and transmits the error message to the user terminal 103 via the communication unit 506.

Step S2209: The secure communication control unit 901 judges whether or not the message received from the license server 101 is the ACK message. When the message received from the license server 101 is the ACK message, the secure communication control unit 901 proceeds to Step S2210. When the message received from the license server 101 is not the ACK message, the secure communication control unit 901 terminates the process.

Step S2210: The secure communication control unit 901 executes an ACK message reception process which will be described later.

This completes the description of the process performed in the commit phase P4.

Figure 23:
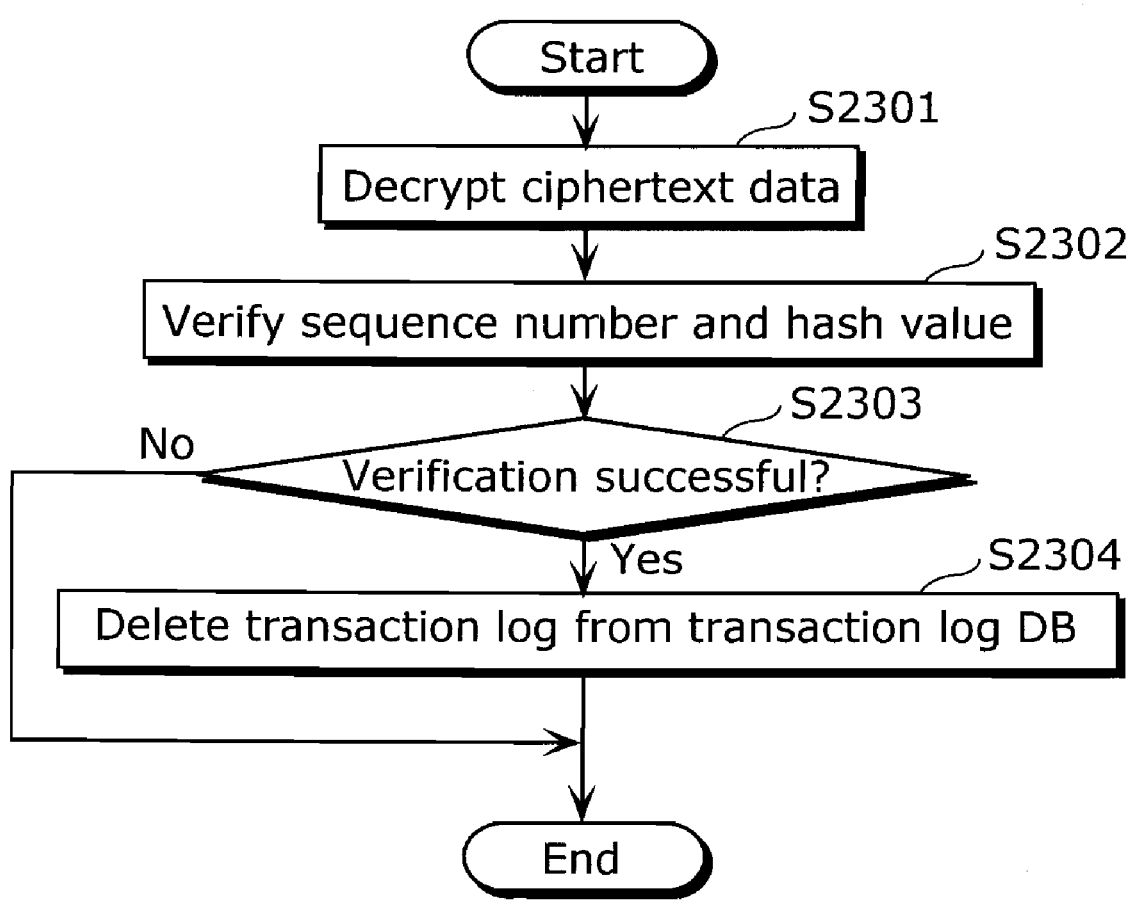
FIG. 23 is a flowchart showing an ACK message reception process in the embodiment of the present invention.

The following describes the ACK message reception process of Step S2210 shown in FIG. 22 in detail, with reference to a flowchart shown in FIG. 23.

Step S2301: The secure communication control unit 901 inputs the ciphertext data included in the ACK message and session key KS to the cryptographic processing unit 905, to decrypt the ciphertext data.

Step S2302: The secure communication control unit 901 verifies sequence number Seq and hash value h.

Step S2303: When the verification in Step S2302 results in a failure, the secure communication control unit 901 terminates the process. When the verification in Step S2302 results in a success, the secure communication control unit 901 proceeds to Step S2304.

Step S2304: The secure communication control unit 901 deletes information relating to the transaction currently in process, from the transaction log database 902.

This completes the description of the ACK message reception process.

Figure 24:
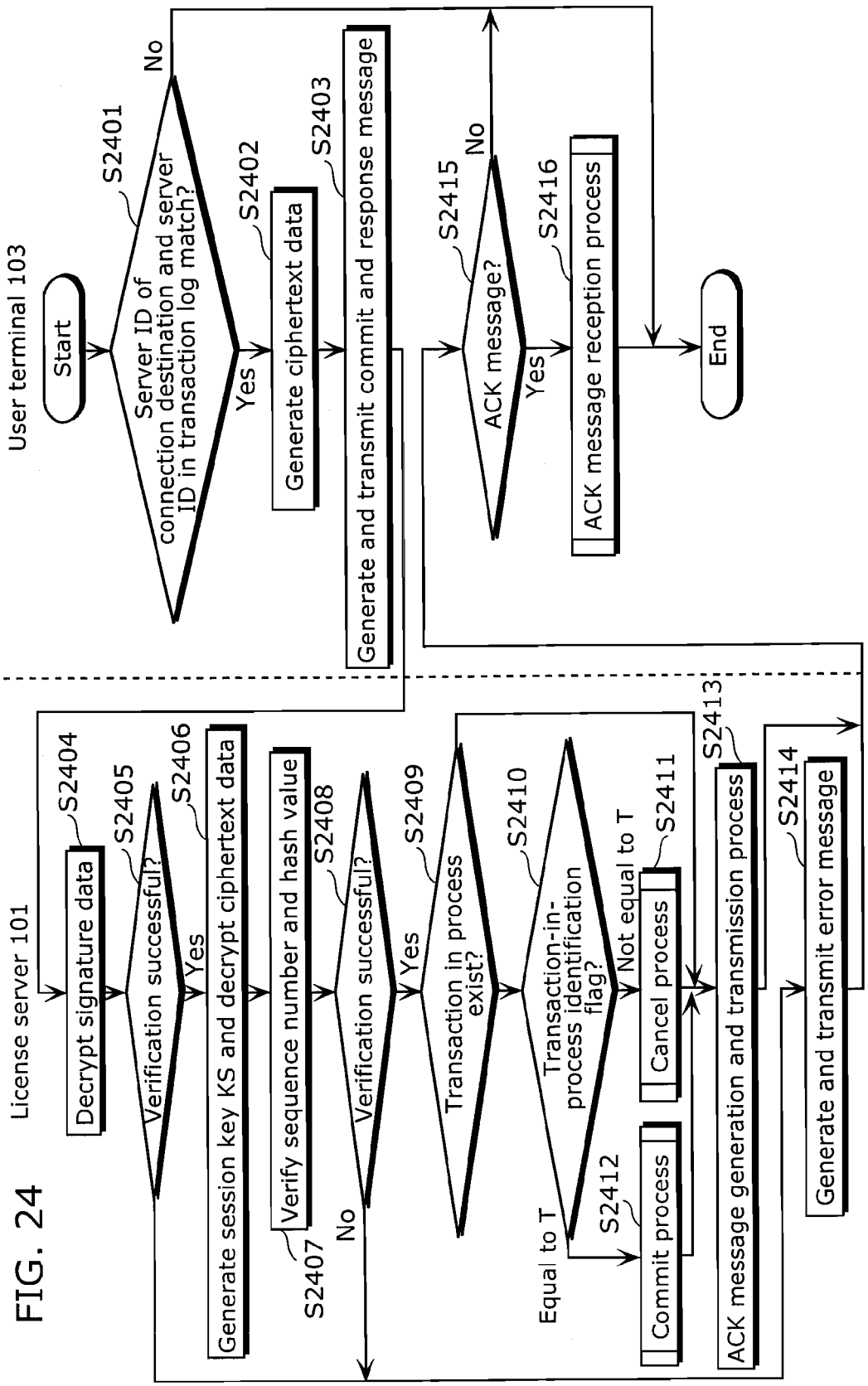
FIG. 24 is a flowchart showing a process performed in an authentication and commit phase P5 in the embodiment of the present invention.

The following describes the process performed in the authentication and commit phase P5, with reference to a flowchart shown in FIG. 24.

Step S2401: The secure communication control unit 901 compares the server ID 1001 included in the server public key certificate received from the license server 101 in communication with the user terminal 103, with the server ID 1001 in the transaction log 1000, to judge whether or not the license server 101 in communication is the license server 101 to which a commit and response message is to be transmitted. When the server ID 1001 included in the server public key certificate received from the license server 101 in communication matches the server ID 1001 in the transaction log 1000, the secure communication control unit 901 proceeds to Step S2402. When the server ID 1001 included in the server public key certificate received from the license server 101 in communication does not match the server ID 1001 in the transaction log 1000, the secure communication control unit 901 terminates the process.

Step S2402: The secure communication control unit 901 concatenates sequence number Seq, transaction identification flag T, and hash value h corresponding to sequence number Seq and transaction identification flag TV and generates ciphertext data (Expression 11) by encrypting the concatenation data using session key KS.

$$E(KS, Seq\|T\|h) \qquad \text{(Expression 11)}.$$

Here, sequence number Seq is set to "0". Subsequently, sequence number Seq is increased by 1 at each instance of message transmission and reception in the same session. Meanwhile, transaction identification flag T is set to the value of the transaction-in-process identification flag 602 in the transaction log 1000.

Step S2403: The secure communication control unit 901 generates a commit and response message that includes DHc generated in Step S1415, the signature (Expression 5) generated in Step S1417, and the ciphertext data (Expression 11) generated in Step S2402, and transmits the commit and response message to the license server 101 via the communication unit 906.

Step S2404: Upon receiving the commit and response message including Diffie-Hellman parameter DHc, the signature data, and the ciphertext data from the user terminal 103 via the communication unit 506, the secure communication control unit 501 in the secure communication unit 302 in the license server 101 generates concatenation data (Expression 7) of random number Rs generated in Step S1405 and DHc, and inputs the concatenation data (Expression 7), the signature data, and the terminal public key certificate to the cryptographic processing unit 505, to verify the signature data.

Step S2405: When the signature verification in Step S2404 results in a failure, the secure communication control unit 501 proceeds to Step S2414. When the signature verification in Step S2404 results in a success, the secure communication control unit 501 proceeds to Step S2406.

Step S2406: The secure communication control unit 501 has the cryptographic processing unit 505 generate session key KS, from DHc included in the commit and response message and Rs2 generated in Step S1405. The secure communication control unit 501 then inputs the ciphertext data included in the commit and response message and generated session key KS to the cryptographic processing unit 505, to decrypt the ciphertext data.

Step S2407: The secure communication control unit 501 verifies sequence number Seq and hash value h.

Step S2408: When the verification in Step S2407 results in a failure, the secure communication control unit 501 proceeds to Step S2414. When the verification in Step S2407 results in a success, the secure communication control unit 501 proceeds to Step S2409.

Step S2409: The secure communication control unit 501 checks the value of the transaction-in-process existence 601 in the transaction log 600. When the value of the transaction-in-process existence 601 is "exist", the secure communication control unit 501 proceeds to Step S2410. When the value of the transaction-in-process existence 601 is "not exist", the secure communication control unit 501 proceeds to Step S2413.

Step S2410: The secure communication control unit 501 checks the value of the transaction-in-process identification flag 602 in the transaction log 600, and the value of transaction identification flag T included in the ciphertext data decrypted in Step S2404. When transaction identification flag T and the transaction-in-process identification flag 602 match, the secure communication control unit 501 proceeds to Step S2412. When transaction identification flag T and the transaction-in-process identification flag 602 do not match, the secure communication control unit 501 proceeds to Step S2411.

Step S2411: The secure communication control unit 501 executes the cancel process described above.

Step S2412: The secure communication control unit 501 executes the commit process described above.

Step S2413: The secure communication control unit 501 concatenates sequence number Seq, transaction identification flag T, ACK command A, and hash value h corresponding to sequence number Seq, transaction identification flag T, and ACK command A, and generates ciphertext data (Expression 10) by encrypting the concatenation data using session key KS. The secure communication control unit 501 then generates an ACK message including the generated ciphertext data (Expression 10), and transmits the ACK message to the user terminal 103 via the communication unit 506. Here, transaction identification flag T is set to the value of the transaction-in-process identification flag 602 in the transaction log 600.

Step S2414: The secure communication control unit 501 generates an error message, and transmits the error message to the user terminal 103 via the communication unit 506.

Step S2415: The secure communication control unit 901 judges whether or not the message received from the license server 101 is the ACK message. When the message received from the license server 101 is the ACK message, the secure communication control unit 901 proceeds to Step S2416. When the message received from the license server 101 is not the ACK message, the secure communication control unit 901 terminates the process.

Step S2416: The secure communication control unit 901 executes the ACK message reception process described above.

This completes the description of the process performed in the authentication and commit phase P5.

Figure 25:
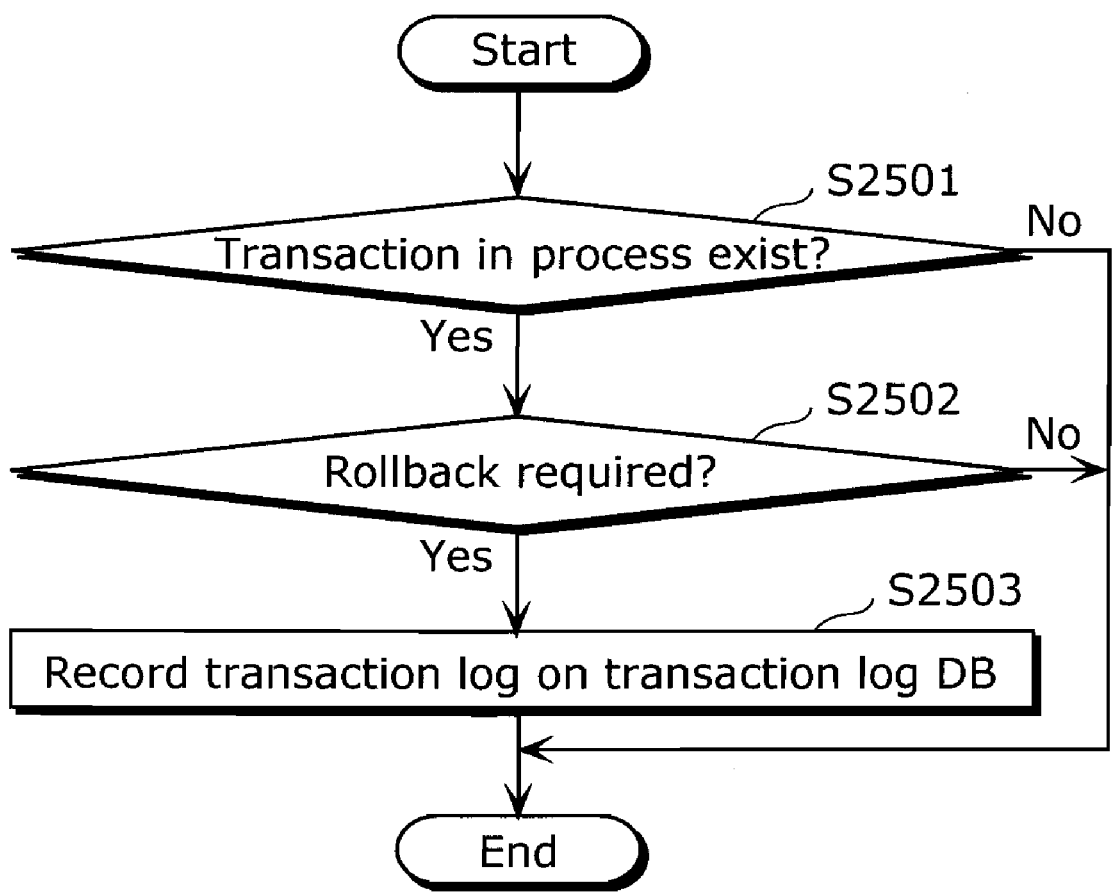
FIG. 25 is a flowchart showing a process when the license server 101 detects communication disconnection in the embodiment of the present invention.
Figure 26:
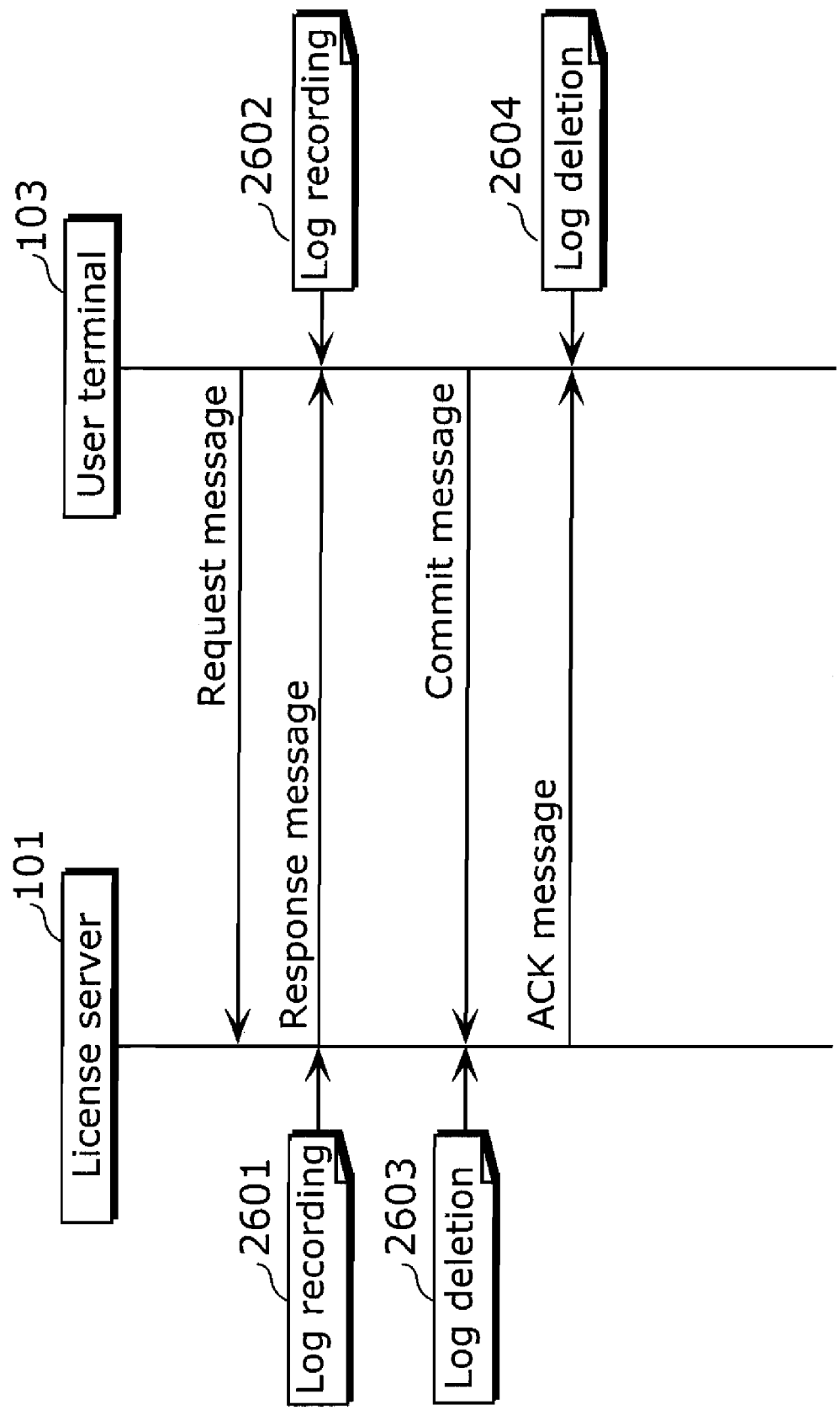
FIG. 26 is a communication sequence diagram of a conventional digital content distribution system.

The following describes a process performed when the license server 101 detects communication disconnection, with reference to a flowchart shown in FIG. 25.

Step S2501: The secure communication control unit 501 checks the value of the transaction-in-process existence 601 in the transaction log 600, to judge whether or not there is a transaction in process with the user terminal 103 from which the license server 101 is disconnected in communication. When there is a transaction in process with the user terminal 103, the secure communication control unit 501 proceeds to Step S2502. When there is no transaction in process with the user terminal 103, the secure communication control unit 501 terminates the process.

Step S2502: The secure communication control unit 501 checks the rollback requirement 603 in the transaction log 600, to judge whether or not rollback is required for the transaction in process with the user terminal 103. When rollback is required, the secure communication control unit 501 proceeds to Step S2503. When rollback is not required, the secure communication control unit 501 terminates the process.

Step S2503: The secure communication control unit 501 records the pair of the terminal ID 401 of the user terminal 103 and the transaction-in-process identification flag 602, to the transaction log database 502.

This completes the description of the process performed when the license server 101 detects communication disconnection.

The above embodiment describes the case where, when the issuable count 402 is unlimited, rollback is not required and transaction identification flat storage instruction TR is set to "recording not required". However, the present invention is not limited to this, as the setting may be performed according to other predetermined rules. As one example, when the usage condition type 203 of the license 200 to be issued is "stateless", rollback is not required and transaction identification flag storage instruction TR is set to "recording not required".

Also, when transmitting a message in response to a message from the user terminal 103, the secure communication control unit 501 may store the transmitted message, and retransmit the stored message upon judging that a message received next is a retransmission of the preceding message.

The above embodiment describes the case where the license 200 is managed in correspondence with the terminal ID 401 in the license database 301, but this is not a limit for the present invention. The license 200 may instead be managed in correspondence with user β, or a domain that is a grouping of user terminals 103.

Also, license obtainment request message Mreq transmitted from the user terminal 103 to the license server 101 may be a request for permission to perform a predetermined operation (for example, a reproduction request or an export request). In detail, in response to license obtainment request message Mreq, the license server 101 may transmit the content key, a retention time limit of the content key, control information, and the like to the user terminal 103. The control information mentioned here may be information for controlling output to each terminal (such as control of ON/OFF of a Macrovision signal or Copy Control Information (CCI)) in the case where the permission request from the user terminal 103 is a reproduction request, and a usage condition of an export destination (such as a value to be set in CCI on a DVD in the case of writing to the DVD) in the case where the permission request from the user terminal 103 is an export request of the license or content to a recording medium and the like.

Also, the license server 101 may judge whether or not the transaction log needs to be recorded, depending on the type of the operation which the user terminal 103 requests for permission. As one example, the license server 101 may judge that the transaction log does not need to be recorded in the case of the reproduction request, and judge that the transaction log needs to be recorded in the case of the export request.

Figure 30:
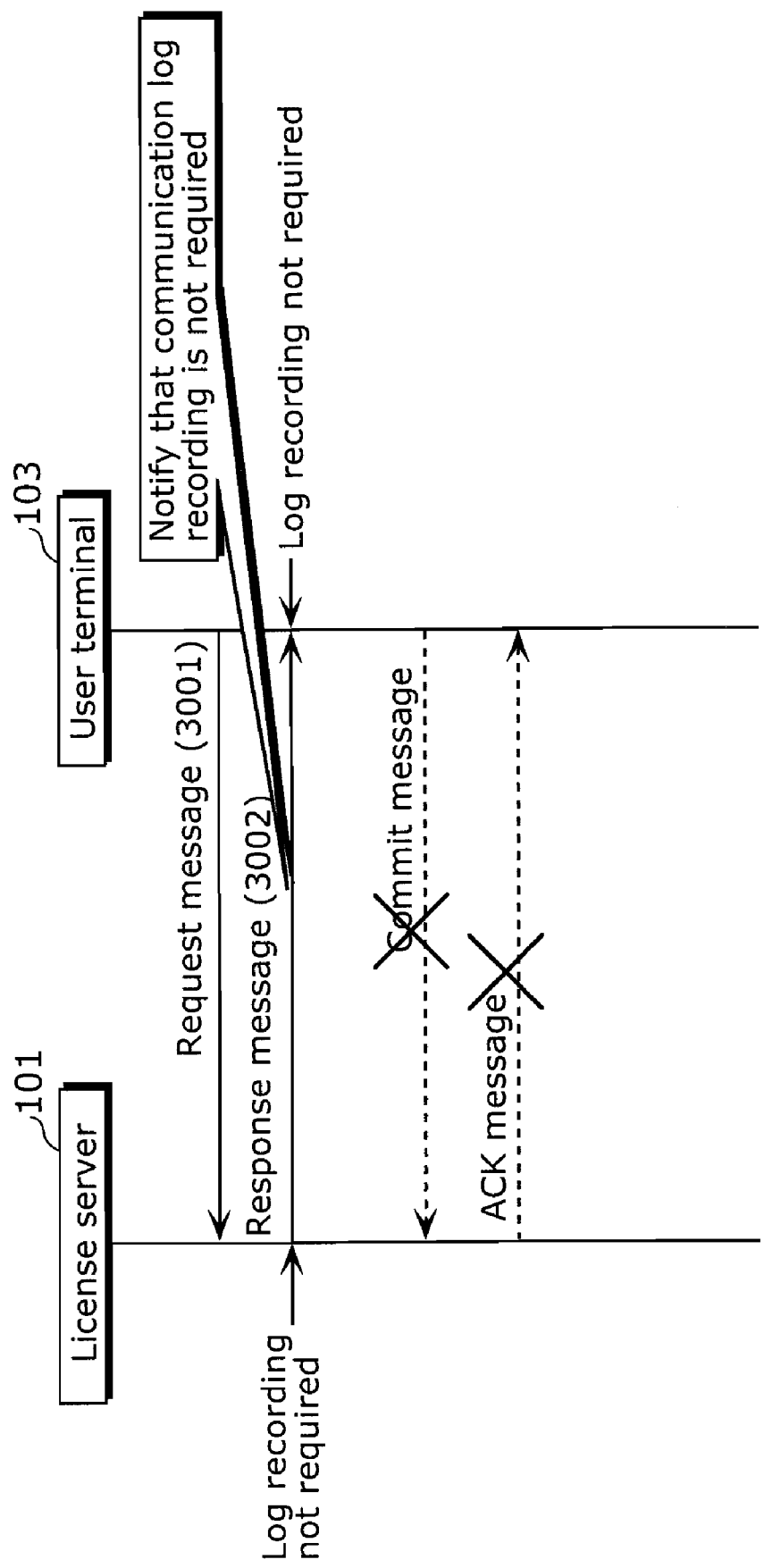
FIG. 30 is a sequence diagram of another session in the digital content distribution system according to the present invention.

Also, as shown in FIG. 30, when notified from the license server 101 that the transaction log does not need to be recorded, the user terminal 103 may omit the transmission of the commit message. According to this structure, in the case where the license 200 that does not require transaction log recording is distributed from the license server 101 to the user terminal 103, not only the number of transaction log updates can be reduced, but also the number of communication operations can be reduced by omitting the communication process from the transmission of the commit message onward.

This embodiment describes the case where the timing at which the license 200 obtained from the license server 101 becomes usable in the user terminal 103 is upon reception of the license 200, but the present invention is not limited to this. For instance, the license 200 may become usable upon reception of the ACK message. Also, the timing at which the license 200 becomes usable may be changed according to the value of transaction identification flag storage instruction TR. One example of this is given below. When transaction identification flag storage instruction TR is "recording not required", the license 200 is put in a usable state upon receiving the license 200. When transaction identification flag storage instruction TR is "recording required", on the other hand, the license 200 is put in a locked state (unusable state) in association with the transaction log upon reception of the license 200 (3102), and put in an unlocked state (usable state) upon reception of the ACK message (3104) in response to the commit message (3103), as shown in FIG. 31. In such a case, since the license 200 cannot be used in the user terminal 103 until the reception of the ACK message, even when the transaction log is deleted from the transaction log database 902, it is possible to avoid double obtainment of the license 200. Accordingly, without a transaction log deletion instruction by a secure command, the transaction log can be deleted from the transaction log database 902 by the user β's intension, based on nonsecure information.

Examples of other methods for deleting the transaction log from the transaction log database 902 in the user terminal 103 include (1) performing the deletion when instructed by a SAC command from a predetermined server, and (2) performing the deletion when obtaining data that is generated by a predetermined provider signing a deletion command, in communication other than SAC (for example, HTTP). In this case, in addition to deleting the transaction log, the license 200 locked in association with the transaction log may be deleted, too.

The above embodiment describes the case where hash value h included in each message is generated by subjecting only one part of the message to computation. However, the present invention is not limited to such, as the entire message may also be subject to computation. In such a case, when the user terminal 103 and the license server 101 judge the contents of the received message, the verification of hash value h may be performed prior to the judgment.

(Other Variations)

Though the present invention has been described by way of the above embodiment, the present invention should not be limited to the above. For example, the present invention also includes the following variations.

(1) Each of the above apparatuses is actually a computer system that includes a microprocessor, a ROM, a RAM, a hard disk unit, a display unit, a keyboard, a mouse, and the like. A computer program is stored on the RAM or the hard disk unit. Functions of each of the apparatuses can be achieved by the microprocessor operating in accordance with the computer program. The computer program mentioned here is a combination of a plurality of instruction codes that represent commands to a computer for achieving predetermined functions.

(2) The components that constitute each of the above apparatuses may be partly or wholly realized by one system LSI (Large Scale Integration). The system LSI is a ultra-multi-functional LSI produced by integrating a plurality of structural units on one chip, and is actually a computer system that includes a microprocessor, a ROM, a RAM, and the like. A computer program is stored on the RAM. Functions of the system LSI can be achieved by the microprocessor operating in accordance with the computer program.

(3) The components that constitute each of the above apparatuses may be partly or wholly realized by an IC card or a single module that is removably connectable to the apparatus. The IC card or the module is a computer system that includes a microprocessor, a ROM, a RAM, and the like. The IC card or the module may include the above ultra-multifunctional LSI. Functions of the IC card or the module can be achieved by the microprocessor operating in accordance with the computer program. The IC card or the module may be tamper resistant.

(4) The present invention may also apply to the method described above. This method may be realized by a computer program that is executed by a computer. Such a computer program may be distributed as a digital signal.

The present invention may be realized by a computer-readable recording medium, such as a flexible disk, a hard disk, a CD-ROM, an MO, a DVD, a DVD-ROM, a DVD-RAM, a Blu-ray Disc (BD), or a semiconductor memory, on which the computer program or the digital signal is recorded. Conversely, the present invention may also be realized by the digital signal recorded on such a recording medium.

The computer program or the digital signal may also be transmitted via a network such as an electronic communication network, a wired or wireless communication network, or the Internet, data broadcasting, and the like.

The present invention can also be realized by a computer system that includes a microprocessor and a memory. In this case, the computer program can be stored in the memory, with the microprocessor operating in accordance with the computer program.

The computer program or the digital signal may be provided to an independent computer system by distributing the recording medium on which the computer program or the digital signal is recorded, or by transmitting the computer program or the digital signal via the network and the like. The independent computer system may then execute the computer program or the digital signal to function as the present invention.

(5) The above embodiment and variations may be freely combined.

INDUSTRIAL APPLICABILITY

The license management apparatus and method according to the present invention can be effectively used, for example, in a content distribution service reception terminal by digital broadcasting, CATV, the Internet, and the like, and a content distribution service reception terminal by package media such as DVDs.

The invention claimed is:

1. A terminal apparatus that transmits a content key request message to a server apparatus, receives a response message to the content key request message from the server apparatus, and uses content, wherein the content key request message includes a transaction flag that is associated with a content key request process currently in execution and takes a value of 0 or 1, the response message includes a content key and a transaction flag storage requirement flag, the transaction flag storage requirement flag indicating whether or not the transaction flag needs to be stored, said terminal apparatus comprises:

a message transmission and reception unit configured to perform message transmission and reception with the server apparatus;

a transaction flag storage unit configured to store the transaction flag therein; and a transaction flag writing unit configured to write the transaction flag into said transaction flag storage unit, and said transaction flag writing unit is configured to write the transaction flag into said transaction flag storage unit, when (1) said message transmission and reception unit receives the response message, and (2) the transaction flag storage requirement flag included in the response message indicates that the transaction flag needs to be stored.

2. The terminal apparatus according to claim 1, wherein said message transmission and reception unit is configured to transmit a commit message to the server apparatus, the commit message notifying that the reception of the response message is successful, and said transaction flag writing unit is configured to delete the transaction flag from said transaction flag storage unit, when
(1) said message transmission and reception unit receives an ACK message from the server apparatus in response to the commit message, and
(2) the transaction flag is stored in said transaction flag storage unit.

3. The terminal apparatus according to claim 2,
wherein the commit message includes the transaction flag,
said message transmission and reception unit is configured to judge whether or not the transaction flag is stored in said transaction flag storage unit before transmitting the content key request message and, when the transaction flag is stored, set the stored transaction flag as the transaction flag included in the commit message, and transmit the commit message to the server apparatus, and
said transaction flag writing unit is configured to delete the transaction flag from said transaction flag storage unit, when said message transmission and reception unit receives the ACK message from the server apparatus in response to the commit message.

4. The terminal apparatus according to claim 2,
wherein said message transmission and reception unit is configured to suppress the transmission of the commit message, when the transaction flag storage requirement flag included in the response message indicates that the transaction flag does not need to be stored.

5. The terminal apparatus according to claim 1,
wherein the response message includes a storage time limit of the transaction flag, and
said transaction flag writing unit is configured to:
write the transaction flag into said transaction flag storage unit in correspondence with the storage time limit; and
delete the transaction flag from said transaction flag storage unit at a predetermined timing, when detecting that the storage time limit has expired.

6. A server apparatus that transmits a response message to a content key request message received from a terminal apparatus,
wherein the content key request message includes a transaction flag that is associated with a content key request process currently in execution and takes a value of 0 or 1,
the response message includes a content key and a transaction flag storage requirement flag, the transaction flag storage requirement flag indicating whether or not the transaction flag needs to be stored,
said server apparatus comprises:
a processor;
a message transmission and reception unit configured to perform message transmission and reception with the terminal apparatus; and
a transaction flag storage requirement setting unit configured to set, by using the processor, the transaction flag storage requirement flag included in the response message, and
said transaction flag storage requirement setting unit is configured to set the transaction flag storage requirement flag to indicate that the transaction flag does not need to be stored, when the transaction flag does not need to be stored in the terminal apparatus, and set the transaction flag storage requirement flag to indicate that the transaction flag needs to be stored, when the transaction flag needs to be stored in the terminal apparatus.

7. The server apparatus according to claim 6, further comprising
a content key transmittable count management unit configured to manage the number of times the content key is transmittable to the terminal apparatus,
wherein said transaction flag storage requirement setting unit is configured to judge that the transaction flag needs to be stored and set the result of the judgment in the transaction flag storage requirement flag, when the number managed by said content key transmittable count management unit is a limited number.

8. The server apparatus according to claim 6, further comprising
a content key transmission history management unit configured to manage a history of transmission of the content key to the terminal apparatus,
wherein said transaction flag storage requirement setting unit is configured to judge that the transaction flag needs to be stored and set the result of the judgment in the transaction flag storage requirement flag, when said content key transmission history management unit manages the history of transmission of the content key to the terminal apparatus.

9. The server apparatus according to claim 6,
wherein the response message includes a storage time limit of the transaction flag, and
said message transmission and reception unit is configured to set the storage time limit of the transaction flag to a predetermined time limit, when said transaction flag storage requirement setting unit sets the transaction flag storage requirement flag to indicate that the transaction flag needs to be stored.

10. The server apparatus according to claim 6, further comprising
a commit processing unit configured to execute a predetermined commit process when the terminal apparatus successfully receives the response message,
wherein said commit processing unit is configured to execute the predetermined commit process, when said message transmission and reception unit receives a commit message from the terminal apparatus, the commit message notifying that the reception of the response message is successful.

11. The server apparatus according to claim 10, further comprising
a rollback processing unit configured to execute a predetermined rollback process when the terminal apparatus fails to receive the response message,
wherein said rollback processing unit is configured to execute the predetermined rollback process, when said message transmission and reception unit, after transmitting the response message, receives a new content key request message from the terminal apparatus before receiving the commit message.

12. A digital content distribution system comprising a server apparatus and a terminal apparatus, said server apparatus distributing a content key, and said terminal apparatus obtaining the content key and using content,
wherein said terminal apparatus transmits a content key request message to said server apparatus,
said server apparatus transmits a response message to the content key request message, to said terminal apparatus,
the content key request message includes a transaction flag that is associated with a content key request process currently in execution and takes a value of 0 or 1,
the response message includes the content key and a transaction flag storage requirement flag, the transaction flag storage requirement flag indicating whether or not the transaction flag needs to be stored, said terminal apparatus comprises:
a first message transmission and reception unit configured to perform message transmission and reception with said server apparatus;
a transaction flag storage unit configured to store the transaction flag therein; and
a transaction flag writing unit configured to write the transaction flag into said transaction flag storage unit,
said transaction flag writing unit is configured to write the transaction flag into said transaction flag storage unit, when
(1) said first message transmission and reception unit receives the response message, and
(2) the transaction flag storage requirement flag included in the response message indicates that the transaction flag needs to be stored,
said server apparatus comprises:
a second message transmission and reception unit configured to perform message transmission and reception with said terminal apparatus; and
a transaction flag storage requirement setting unit configured to set the transaction flag storage requirement flag to indicate that the transaction flag does not need to be stored, when the transaction flag does not need to be stored in the terminal apparatus, and set the transaction flag storage requirement flag to indicate that the transaction flag needs to be stored, when the transaction flag needs to be stored in the terminal apparatus.

13. A computer-readable medium encoded with a computer program for use in a terminal apparatus that transmits a content key request message to a server apparatus, receives a response message to the content key request message from the server apparatus, and uses content,
wherein the content key request message includes a transaction flag that is associated with a content key request process currently in execution and takes a value of 0 or 1,
the response message includes a content key and a transaction flag storage requirement flag, the transaction flag storage requirement flag indicating whether or not the transaction flag needs to be stored,
said program causes a computer to execute:
performing message transmission and reception with the server apparatus; and
writing the transaction flag into a transaction flag storage unit in the terminal apparatus,
wherein said writing includes writing the transaction flag into the transaction flag storage unit, when
(1) the response message is received in said performing message transmission and reception, and
(2) the transaction flag storage requirement flag included in the response message indicates that the transaction flag needs to be stored.

14. A computer-readable medium encoded with a computer program for use in a server apparatus that transmits a response message to a content key request message received from a terminal apparatus,
wherein the content key request message includes a transaction flag that is associated with a content key request process currently in execution and takes a value of 0 or 1,
the response message includes a content key and a transaction flag storage requirement flag, the transaction flag storage requirement flag indicating whether or not the transaction flag needs to be stored,
said program causes a computer to execute:
performing message transmission and reception with the terminal apparatus; and
setting the transaction flag storage requirement flag included in the response message,
wherein said setting includes setting the transaction flag storage requirement flag to indicate that the transaction flag does not need to be stored, when the transaction flag does not need to be stored in the terminal apparatus, and setting the transaction flag storage requirement flag to indicate that the transaction flag needs to be stored, when the transaction flag needs to be stored in the terminal apparatus.

15. A transaction processing method in a terminal apparatus that transmits a content key request message to a server apparatus, receives a response message to the content key request message from the server apparatus, and uses content,
wherein the content key request message includes a transaction flag that is associated with a content key request process currently in execution and takes a value of 0 or 1,
the response message includes a content key and a transaction flag storage requirement flag, the transaction flag storage requirement flag indicating whether or not the transaction flag needs to be stored,
said transaction processing method comprises:
performing message transmission and reception with the server apparatus; and
writing the transaction flag into a transaction flag storage unit in the terminal apparatus, and
said writing includes writing the transaction flag into the transaction flag storage unit, when
(1) the response message is received in said performing message transmission and reception, and
(2) the transaction flag storage requirement flag included in the response message indicates that the transaction flag needs to be stored.

16. A transaction processing method in a server apparatus that transmits a response message to a content key request message received from a terminal apparatus,
wherein the content key request message includes a transaction flag that is associated with a content key request process currently in execution and takes a value of 0 or 1,
the response message includes a content key and a transaction flag storage requirement flag, the transaction flag storage requirement flag indicating whether or not the transaction flag needs to be stored,
said transaction processing method comprises:
performing message transmission and reception with the terminal apparatus; and
setting the transaction flag storage requirement flag included in the response message, and
said setting includes setting the transaction flag storage requirement flag to indicate that the transaction flag does not need to be stored, when the transaction flag does not need to be stored in the terminal apparatus, and setting the transaction flag storage requirement flag to indicate that the transaction flag needs to be stored, when the transaction flag needs to be stored in the terminal apparatus.

* * * * *